(12) United States Patent
Bless et al.

(10) Patent No.: US 10,575,558 B2
(45) Date of Patent: Mar. 3, 2020

(54) AEROSOL DELIVERY DEVICE COMPRISING MULTIPLE OUTER BODIES AND RELATED ASSEMBLY METHOD

(71) Applicant: R.J. Reynolds Tobacco Company, Winston-Salem, NC (US)

(72) Inventors: Alfred Charles Bless, Asheboro, NC (US); Michael Andrew Liberti, Clemmons, NC (US); Timothy Brian Nestor, Advance, NC (US); Frederic Philippe Ampolini, Winston-Salem, NC (US); Michael Ryan Galloway, Winston-Salem, NC (US)

(73) Assignee: RAI Strategic Holdings, Inc., Winston-Salem, NC (US)

( * ) Notice: Subject to any disclaimer, the term of this patent is extended or adjusted under 35 U.S.C. 154(b) by 765 days.

(21) Appl. No.: 14/530,275

(22) Filed: Oct. 31, 2014

(65) Prior Publication Data
US 2015/0216236 A1    Aug. 6, 2015

Related U.S. Application Data

(63) Continuation-in-part of application No. 14/170,838, filed on Feb. 3, 2014.

(51) Int. Cl.
*A24F 47/00* (2006.01)
*B23K 26/20* (2014.01)

(52) U.S. Cl.
CPC ............ *A24F 47/008* (2013.01); *B23K 26/20* (2013.01)

(58) Field of Classification Search
CPC ...... A24F 47/008; B23K 26/20; A61M 15/06; F16L 17/025
See application file for complete search history.

(56) References Cited

U.S. PATENT DOCUMENTS

| 1,771,366 A | 7/1930 | Wyss et al. |
| 2,057,353 A | 10/1936 | Whittemore, Jr. |

(Continued)

FOREIGN PATENT DOCUMENTS

| AU | 276250 | 7/1965 |
| CA | 2 641 869 | 5/2010 |

(Continued)

OTHER PUBLICATIONS

Wikipedia, Nipple (Plumbing); https://en.wikipedia.org/wiki/Nipple_(plumbing).*

(Continued)

*Primary Examiner* — Michael J Felton
*Assistant Examiner* — Jerzi H Moreno Hernandez
(74) *Attorney, Agent, or Firm* — Womble Bond Dickinson (US) LLP

(57) ABSTRACT

The present disclosure relates to an aerosol delivery device. The aerosol delivery device may include a first outer body, a second outer body, and a coupler defining a coupler inlet positioned between, and welded to, the first outer body and the second outer body. A sealing member may be engaged with the coupler, the sealing member including one or more penetrable portions, wherein the one or more penetrable portions of the sealing member are configured to be pierced with one or more electrical connectors such that the one or more electrical connectors extend through the sealing member from the coupler and seal against the sealing member. Related assembly methods are also provided.

19 Claims, 27 Drawing Sheets

(56) References Cited

U.S. PATENT DOCUMENTS

| | | |
|---|---|---|
| 2,104,266 A | 1/1938 | McCormick |
| 2,805,669 A | 9/1957 | Meriro |
| 3,200,819 A | 8/1965 | Gilbert |
| 3,316,919 A | 5/1967 | Green et al. |
| 3,398,754 A | 8/1968 | Tughan |
| 3,419,015 A | 12/1968 | Wochnowski |
| 3,424,171 A | 1/1969 | Rooker |
| 3,476,118 A | 11/1969 | Luttich |
| 3,913,928 A * | 10/1975 | Yamaguchi .............. E03C 1/14 277/604 |
| 4,054,145 A | 10/1977 | Berndt et al. |
| 4,131,117 A | 12/1978 | Kite et al. |
| 4,150,677 A | 4/1979 | Osborne |
| 4,190,046 A | 2/1980 | Virag |
| 4,219,032 A | 8/1980 | Tabatznik et al. |
| 4,259,970 A | 4/1981 | Green, Jr. |
| 4,284,089 A | 8/1981 | Ray |
| 4,293,138 A * | 10/1981 | Swantee .................. F16L 5/10 277/607 |
| 4,303,083 A | 12/1981 | Burruss, Jr. |
| 4,449,541 A | 5/1984 | Mays et al. |
| 4,506,682 A | 3/1985 | Muller |
| 4,635,651 A | 1/1987 | Jacobs |
| 4,674,519 A | 6/1987 | Keritsis et al. |
| 4,708,151 A | 11/1987 | Shelar |
| 4,714,082 A | 12/1987 | Banerjee et al. |
| 4,735,217 A | 4/1988 | Gerth et al. |
| 4,756,318 A | 7/1988 | Clearman et al. |
| 4,771,795 A | 9/1988 | White et al. |
| 4,776,353 A | 10/1988 | Lilja et al. |
| 4,793,365 A | 12/1988 | Sensabaugh, Jr. et al. |
| 4,800,903 A | 1/1989 | Ray et al. |
| 4,819,665 A | 4/1989 | Roberts et al. |
| 4,821,749 A | 4/1989 | Toft et al. |
| 4,830,028 A | 5/1989 | Lawson et al. |
| 4,836,224 A | 6/1989 | Lawson et al. |
| 4,836,225 A | 6/1989 | Sudoh |
| 4,848,374 A | 7/1989 | Chard et al. |
| 4,848,376 A | 7/1989 | Lilja et al. |
| 4,874,000 A | 10/1989 | Tamol et al. |
| 4,880,018 A | 11/1989 | Graves, Jr. et al. |
| 4,887,619 A | 12/1989 | Burcham, Jr. et al. |
| 4,907,606 A | 3/1990 | Lilja et al. |
| 4,913,168 A | 4/1990 | Potter et al. |
| 4,917,119 A | 4/1990 | Potter et al. |
| 4,917,128 A | 4/1990 | Clearman et al. |
| 4,922,901 A | 5/1990 | Brooks et al. |
| 4,924,888 A | 5/1990 | Perfetti et al. |
| 4,928,714 A | 5/1990 | Shannon |
| 4,938,236 A | 7/1990 | Banerjee et al. |
| 4,941,483 A | 7/1990 | Ridings et al. |
| 4,941,484 A | 7/1990 | Clapp et al. |
| 4,945,931 A | 8/1990 | Gori |
| 4,947,874 A | 8/1990 | Brooks et al. |
| 4,947,875 A | 8/1990 | Brooks et al. |
| 4,972,854 A | 11/1990 | Kiernan et al. |
| 4,972,855 A | 11/1990 | Kuriyama et al. |
| 4,986,286 A | 1/1991 | Roberts et al. |
| 4,987,906 A | 1/1991 | Young et al. |
| 5,005,593 A | 4/1991 | Fagg |
| 5,019,122 A | 5/1991 | Clearman et al. |
| 5,022,416 A | 6/1991 | Watson |
| 5,042,510 A | 8/1991 | Curtiss et al. |
| 5,056,537 A | 10/1991 | Brown et al. |
| 5,060,669 A | 10/1991 | White et al. |
| 5,060,671 A | 10/1991 | Counts et al. |
| 5,065,775 A | 11/1991 | Fagg |
| 5,072,744 A | 12/1991 | Luke et al. |
| 5,074,319 A | 12/1991 | White et al. |
| 5,076,296 A | 12/1991 | Nystrom et al. |
| 5,093,894 A | 3/1992 | Deevi et al. |
| 5,095,921 A | 3/1992 | Losee et al. |
| 5,097,850 A | 3/1992 | Braunshteyn et al. |
| 5,099,862 A | 3/1992 | White et al. |
| 5,099,864 A | 3/1992 | Young et al. |
| 5,101,839 A | 4/1992 | Jakob et al. |
| 5,103,842 A | 4/1992 | Strang et al. |
| 5,121,757 A | 6/1992 | White et al. |
| 5,129,409 A | 7/1992 | White et al. |
| 5,131,415 A | 7/1992 | Munoz et al. |
| 5,144,962 A | 8/1992 | Counts et al. |
| 5,143,097 A | 9/1992 | Sohn et al. |
| 5,146,934 A | 9/1992 | Deevi et al. |
| 5,154,192 A | 10/1992 | Sprinkel et al. |
| 5,159,940 A | 11/1992 | Hayward et al. |
| 5,159,942 A | 11/1992 | Brinkley et al. |
| 5,179,966 A | 1/1993 | Losee et al. |
| 5,211,684 A | 5/1993 | Shannon et al. |
| 5,220,930 A | 6/1993 | Gentry |
| 5,224,498 A | 7/1993 | Deevi et al. |
| 5,228,460 A | 7/1993 | Sprinkel, Jr. et al. |
| 5,230,354 A | 7/1993 | Smith et al. |
| 5,235,992 A | 8/1993 | Sensabaugh |
| 5,243,999 A | 9/1993 | Smith |
| 5,246,018 A | 9/1993 | Deevi et al. |
| 5,249,586 A | 10/1993 | Morgan et al. |
| 5,261,424 A | 11/1993 | Sprinkel, Jr. |
| 5,269,327 A | 12/1993 | Counts et al. |
| 5,285,798 A | 2/1994 | Banerjee et al. |
| 5,293,883 A | 3/1994 | Edwards |
| 5,301,694 A | 4/1994 | Raymond |
| 5,303,720 A | 4/1994 | Banerjee et al. |
| 5,318,050 A | 6/1994 | Gonzalez-Parra et al. |
| 5,322,075 A | 6/1994 | Deevi et al. |
| 5,322,076 A | 6/1994 | Brinkley et al. |
| 5,339,838 A | 8/1994 | Young et al. |
| 5,345,951 A | 9/1994 | Serrano et al. |
| 5,353,813 A | 10/1994 | Deevi et al. |
| 5,357,984 A | 10/1994 | Farrier et al. |
| 5,360,023 A | 11/1994 | Blakley et al. |
| 5,369,723 A | 11/1994 | Counts et al. |
| 5,372,148 A | 12/1994 | McCafferty et al. |
| 5,377,698 A | 1/1995 | Litzinger et al. |
| 5,388,574 A | 2/1995 | Ingebrethsen et al. |
| 5,388,594 A | 2/1995 | Counts et al. |
| 5,408,574 A | 4/1995 | Deevi et al. |
| 5,435,325 A | 7/1995 | Clapp et al. |
| 5,445,169 A | 8/1995 | Brinkley et al. |
| 5,468,266 A | 11/1995 | Bensalem et al. |
| 5,468,936 A | 11/1995 | Deevi et al. |
| 5,479,948 A | 1/1996 | Counts et al. |
| 5,498,850 A | 3/1996 | Das |
| 5,498,855 A | 3/1996 | Deevi et al. |
| 5,499,636 A | 3/1996 | Baggett, Jr. et al. |
| 5,501,237 A | 3/1996 | Young et al. |
| 5,505,214 A | 4/1996 | Collins et al. |
| 5,515,842 A | 5/1996 | Ramseyer et al. |
| 5,530,225 A | 6/1996 | Hajaligol |
| 5,551,450 A | 9/1996 | Hemsley |
| 5,551,451 A | 9/1996 | Riggs et al. |
| 5,564,442 A | 10/1996 | MacDonald et al. |
| 5,573,692 A | 11/1996 | Das et al. |
| 5,591,368 A | 1/1997 | Fleischhauer et al. |
| 5,593,792 A | 1/1997 | Farrier et al. |
| 5,595,577 A | 1/1997 | Bensalem et al. |
| 5,596,706 A | 1/1997 | Sikk et al. |
| 5,611,360 A | 3/1997 | Tang |
| 5,613,504 A | 3/1997 | Collins et al. |
| 5,613,505 A | 3/1997 | Campbell et al. |
| 5,649,552 A | 7/1997 | Cho et al. |
| 5,649,554 A | 7/1997 | Sprinkel et al. |
| 5,659,656 A | 8/1997 | Das |
| 5,665,262 A | 9/1997 | Hajaligol et al. |
| 5,666,976 A | 9/1997 | Adams et al. |
| 5,666,977 A | 9/1997 | Higgins et al. |
| 5,666,978 A | 9/1997 | Counts et al. |
| 5,687,746 A | 11/1997 | Rose et al. |
| 5,692,525 A | 12/1997 | Counts et al. |
| 5,692,526 A | 12/1997 | Adams et al. |
| 5,708,258 A | 1/1998 | Counts et al. |
| 5,711,320 A | 1/1998 | Martin |
| 5,726,421 A | 3/1998 | Fleischhauer et al. |
| 5,727,571 A | 3/1998 | Meiring et al. |
| 5,730,158 A | 3/1998 | Collins et al. |

(56) References Cited

U.S. PATENT DOCUMENTS

| | | |
|---|---|---|
| 5,750,964 A | 5/1998 | Counts et al. |
| 5,799,663 A | 9/1998 | Gross et al. |
| 5,816,263 A | 10/1998 | Counts et al. |
| 5,819,756 A | 10/1998 | Mielordt |
| 5,829,453 A | 11/1998 | White et al. |
| 5,865,185 A | 2/1999 | Collins et al. |
| 5,865,186 A | 2/1999 | Volsey, II |
| 5,878,752 A | 3/1999 | Adams et al. |
| 5,880,439 A | 3/1999 | Deevi et al. |
| 5,894,841 A | 4/1999 | Voges |
| 5,915,387 A | 7/1999 | Baggett, Jr. et al. |
| 5,934,289 A | 8/1999 | Watkins et al. |
| 5,954,979 A | 9/1999 | Counts et al. |
| 5,967,148 A | 10/1999 | Harris et al. |
| 6,026,820 A | 2/2000 | Baggett, Jr. et al. |
| 6,033,623 A | 3/2000 | Deevi et al. |
| 6,040,560 A | 3/2000 | Fleischhauer et al. |
| 6,053,176 A | 4/2000 | Adams et al. |
| 6,089,857 A | 7/2000 | Matsuura et al. |
| 6,095,153 A | 8/2000 | Kessler et al. |
| 6,116,247 A | 9/2000 | Banyasz et al. |
| 6,119,700 A | 9/2000 | Fleischhauer et al. |
| 6,125,853 A | 10/2000 | Susa et al. |
| 6,125,855 A | 10/2000 | Nevett et al. |
| 6,125,866 A | 10/2000 | Nichols et al. |
| 6,155,268 A | 12/2000 | Takeuchi |
| 6,164,287 A | 12/2000 | White |
| 6,182,670 B1 | 2/2001 | White |
| 6,196,218 B1 | 3/2001 | Voges |
| 6,196,219 B1 | 3/2001 | Hess et al. |
| 6,216,706 B1 | 4/2001 | Kumar et al. |
| 6,289,898 B1 | 9/2001 | Fournier et al. |
| 6,349,729 B1 | 2/2002 | Pham |
| 6,357,671 B1 | 3/2002 | Cewers |
| 6,418,938 B1 | 7/2002 | Fleischhauer et al. |
| 6,446,426 B1 | 8/2002 | Sweeney et al. |
| 6,532,965 B1 | 3/2003 | Abhulimen et al. |
| 6,598,607 B2 | 7/2003 | Adiga et al. |
| 6,601,776 B1 | 8/2003 | Oljaca et al. |
| 6,615,840 B1 | 9/2003 | Fournier et al. |
| 6,688,313 B2 | 2/2004 | Wrenn et al. |
| 6,701,936 B2 | 3/2004 | Shafer et al. |
| 6,715,494 B1 | 4/2004 | McCoy |
| 6,730,832 B1 | 5/2004 | Dominguez et al. |
| 6,772,756 B2 | 8/2004 | Shayan |
| 6,803,545 B2 | 10/2004 | Blake et al. |
| 6,803,550 B2 | 10/2004 | Sharpe et al. |
| 6,810,883 B2 | 11/2004 | Felter et al. |
| 6,854,461 B2 | 2/2005 | Nichols |
| 6,854,470 B1 | 2/2005 | Pu |
| 6,994,096 B2 | 2/2006 | Rostami et al. |
| 7,011,096 B2 | 3/2006 | Li et al. |
| 7,017,585 B2 | 3/2006 | Li et al. |
| 7,025,066 B2 | 4/2006 | Lawson et al. |
| 7,040,314 B2 | 5/2006 | Nguyen et al. |
| 7,117,867 B2 | 10/2006 | Cox et al. |
| 7,163,015 B2 | 1/2007 | Moffitt |
| 7,173,322 B2 | 2/2007 | Cox et al. |
| 7,185,659 B2 | 3/2007 | Sharpe et al. |
| 7,234,470 B2 | 6/2007 | Yang |
| 7,290,549 B2 | 11/2007 | Banerjee et al. |
| 7,293,565 B2 | 11/2007 | Griffin et al. |
| 7,392,809 B2 | 7/2008 | Larson et al. |
| 7,513,253 B2 | 4/2009 | Kobayashi et al. |
| 7,647,932 B2 | 1/2010 | Cantrell et al. |
| 7,690,385 B2 | 4/2010 | Moffitt |
| 7,692,123 B2 | 4/2010 | Baba et al. |
| 7,726,320 B2 | 6/2010 | Robinson et al. |
| 7,775,459 B2 | 8/2010 | Martens, III et al. |
| 7,810,505 B2 | 10/2010 | Yang |
| 7,832,410 B2 | 11/2010 | Hon |
| 7,845,359 B2 | 12/2010 | Montaser |
| 7,878,209 B2 | 2/2011 | Newbery et al. |
| 7,896,006 B2 | 3/2011 | Hamano et al. |
| 8,066,010 B2 | 11/2011 | Newbery et al. |
| 8,079,371 B2 | 12/2011 | Robinson et al. |
| 8,127,772 B2 | 3/2012 | Montaser |
| 8,156,944 B2 | 4/2012 | Han |
| 8,314,591 B2 | 11/2012 | Terry et al. |
| 8,365,742 B2 | 2/2013 | Hon |
| 8,375,957 B2 | 2/2013 | Hon |
| 8,393,331 B2 | 3/2013 | Hon |
| 8,402,976 B2 | 3/2013 | Fernando et al. |
| 8,499,766 B1 | 8/2013 | Newton |
| 8,528,569 B1 | 9/2013 | Newton |
| 8,539,959 B1 | 9/2013 | Scatterday |
| 8,550,069 B2 | 10/2013 | Alelov |
| 8,905,040 B2 | 12/2014 | Scatterday et al. |
| 9,210,738 B2 | 12/2015 | Ward et al. |
| 9,254,002 B2 | 2/2016 | Chong et al. |
| 9,484,155 B2 | 11/2016 | Peckerar et al. |
| 2002/0146242 A1 | 10/2002 | Vieira |
| 2003/0131859 A1 | 7/2003 | Li et al. |
| 2003/0226837 A1 | 12/2003 | Blake et al. |
| 2004/0020500 A1 | 2/2004 | Wrenn et al. |
| 2004/0118401 A1 | 6/2004 | Smith et al. |
| 2004/0129280 A1 | 7/2004 | Woodson et al. |
| 2004/0149296 A1 | 8/2004 | Rostami et al. |
| 2004/0200488 A1 | 10/2004 | Felter et al. |
| 2004/0226568 A1 | 11/2004 | Takeuchi et al. |
| 2004/0255965 A1 | 12/2004 | Perfetti et al. |
| 2005/0016549 A1 | 1/2005 | Banerjee et al. |
| 2005/0016550 A1 | 1/2005 | Katase |
| 2005/0066986 A1 | 3/2005 | Nestor et al. |
| 2005/0172976 A1 | 8/2005 | Newman et al. |
| 2005/0274390 A1 | 12/2005 | Banerjee et al. |
| 2006/0016453 A1 | 1/2006 | Kim |
| 2006/0070633 A1 | 4/2006 | Rostami et al. |
| 2006/0162733 A1 | 7/2006 | McGrath et al. |
| 2006/0185687 A1 | 8/2006 | Hearn et al. |
| 2006/0196518 A1 | 9/2006 | Hon |
| 2007/0074734 A1 | 4/2007 | Braunshteyn et al. |
| 2007/0102013 A1 | 5/2007 | Adams et al. |
| 2007/0215167 A1 | 9/2007 | Crooks et al. |
| 2007/0283972 A1 | 12/2007 | Monsees et al. |
| 2008/0085103 A1 | 4/2008 | Beland et al. |
| 2008/0092912 A1 | 4/2008 | Robinson et al. |
| 2008/0097321 A1* | 4/2008 | Mounce ............... A61J 1/1406 604/132 |
| 2008/0149118 A1 | 6/2008 | Oglesby et al. |
| 2008/0245377 A1 | 10/2008 | Marshall et al. |
| 2008/0257367 A1 | 10/2008 | Paterno et al. |
| 2008/0276947 A1 | 11/2008 | Martzel |
| 2008/0302374 A1 | 12/2008 | Wengert et al. |
| 2009/0065010 A1 | 3/2009 | Shands |
| 2009/0095311 A1 | 4/2009 | Hon |
| 2009/0095312 A1 | 4/2009 | Herbrich et al. |
| 2009/0126745 A1 | 5/2009 | Hon |
| 2009/0188490 A1 | 7/2009 | Hon |
| 2009/0230117 A1 | 9/2009 | Fernando et al. |
| 2009/0260641 A1 | 10/2009 | Monsees et al. |
| 2009/0260642 A1 | 10/2009 | Monsees et al. |
| 2009/0272379 A1 | 11/2009 | Thorens et al. |
| 2009/0283103 A1 | 11/2009 | Nielsen et al. |
| 2009/0293892 A1 | 12/2009 | Williams et al. |
| 2009/0320863 A1 | 12/2009 | Fernando et al. |
| 2009/0324206 A1 | 12/2009 | Young et al. |
| 2010/0006113 A1 | 1/2010 | Urtsev et al. |
| 2010/0024834 A1 | 2/2010 | Oglesby et al. |
| 2010/0043809 A1 | 2/2010 | Magnon |
| 2010/0059070 A1 | 3/2010 | Potter et al. |
| 2010/0059073 A1 | 3/2010 | Hoffmann et al. |
| 2010/0065075 A1 | 3/2010 | Banerjee et al. |
| 2010/0083959 A1 | 4/2010 | Siller |
| 2010/0163063 A1 | 7/2010 | Fernando et al. |
| 2010/0200006 A1 | 8/2010 | Robinson et al. |
| 2010/0229881 A1 | 9/2010 | Hearn |
| 2010/0242974 A1 | 9/2010 | Pan |
| 2010/0242976 A1 | 9/2010 | Katayama et al. |
| 2010/0258139 A1 | 10/2010 | Onishi et al. |
| 2010/0300467 A1 | 12/2010 | Kuistilla et al. |
| 2010/0307518 A1 | 12/2010 | Wang |
| 2010/0313901 A1 | 12/2010 | Fernando et al. |
| 2011/0005535 A1 | 1/2011 | Xiu |

(56) References Cited

U.S. PATENT DOCUMENTS

| | | |
|---|---|---|
| 2011/0011396 A1 | 1/2011 | Fang |
| 2011/0036346 A1 | 2/2011 | Cohen et al. |
| 2011/0036363 A1 | 2/2011 | Urtsev et al. |
| 2011/0036365 A1 | 2/2011 | Chong et al. |
| 2011/0073121 A1 | 3/2011 | Levin et al. |
| 2011/0088707 A1 | 4/2011 | Hajaligol |
| 2011/0094523 A1 | 4/2011 | Thorens et al. |
| 2011/0120480 A1 | 5/2011 | Brenneise |
| 2011/0126847 A1 | 6/2011 | Zuber et al. |
| 2011/0126848 A1 | 6/2011 | Zuber et al. |
| 2011/0155153 A1 | 6/2011 | Thorens et al. |
| 2011/0155718 A1 | 6/2011 | Greim et al. |
| 2011/0162663 A1 | 7/2011 | Bryman |
| 2011/0168194 A1 | 7/2011 | Hon |
| 2011/0180082 A1 | 7/2011 | Banerjee et al. |
| 2011/0265806 A1 | 11/2011 | Alarcon et al. |
| 2011/0303231 A1* | 12/2011 | Li .................... A24F 47/008 131/329 |
| 2011/0309157 A1 | 12/2011 | Yang et al. |
| 2012/0006346 A1 | 1/2012 | Inagaki |
| 2012/0042885 A1 | 2/2012 | Stone et al. |
| 2012/0060853 A1 | 3/2012 | Robinson et al. |
| 2012/0111347 A1 | 5/2012 | Hon |
| 2012/0132643 A1 | 5/2012 | Choi et al. |
| 2012/0145169 A1 | 6/2012 | Wu |
| 2012/0227752 A1 | 9/2012 | Alelov |
| 2012/0231464 A1 | 9/2012 | Yu et al. |
| 2012/0260927 A1 | 10/2012 | Liu |
| 2012/0279512 A1 | 11/2012 | Hon |
| 2012/0318882 A1 | 12/2012 | Abehasera |
| 2013/0008457 A1 | 1/2013 | Zheng et al. |
| 2013/0037041 A1 | 2/2013 | Worm et al. |
| 2013/0056013 A1 | 3/2013 | Terry et al. |
| 2013/0081625 A1 | 4/2013 | Rustad et al. |
| 2013/0081642 A1 | 4/2013 | Safari |
| 2013/0180533 A1* | 7/2013 | Kim .................... A24F 47/008 131/273 |
| 2013/0192618 A1 | 8/2013 | Li et al. |
| 2013/0192619 A1* | 8/2013 | Tucker .................... H01C 17/00 131/329 |
| 2013/0192623 A1 | 8/2013 | Tucker et al. |
| 2013/0220315 A1* | 8/2013 | Conley .................... A24F 47/008 128/202.21 |
| 2013/0228191 A1* | 9/2013 | Newton .................... A61M 15/06 131/329 |
| 2013/0255702 A1 | 10/2013 | Griffith, Jr. et al. |
| 2013/0276802 A1 | 10/2013 | Scatterday |
| 2013/0298905 A1 | 11/2013 | Levin et al. |
| 2013/0306084 A1 | 11/2013 | Flick |
| 2013/0319439 A1 | 12/2013 | Gorelick et al. |
| 2013/0340750 A1 | 12/2013 | Thorens et al. |
| 2013/0340775 A1 | 12/2013 | Juster et al. |
| 2013/0340779 A1* | 12/2013 | Liu .................... A24F 47/002 131/329 |
| 2014/0000638 A1 | 1/2014 | Sebastian et al. |
| 2014/0034071 A1* | 2/2014 | Levitz .................... A24F 47/008 131/329 |
| 2014/0060524 A1* | 3/2014 | Liu .................... A24F 47/008 128/200.14 |
| 2014/0060554 A1 | 3/2014 | Collett et al. |
| 2014/0060555 A1 | 3/2014 | Chang et al. |
| 2014/0096781 A1 | 4/2014 | Sears et al. |
| 2014/0096782 A1 | 4/2014 | Ampolini et al. |
| 2014/0144453 A1 | 5/2014 | Capuano et al. |
| 2014/0150784 A1* | 6/2014 | Liu .................... A24F 47/008 128/202.21 |
| 2014/0182612 A1* | 7/2014 | Chen .................... A24F 47/008 131/329 |
| 2014/0196718 A1* | 7/2014 | Li .................... A61M 11/041 128/202.21 |
| 2014/0202475 A1 | 7/2014 | Liu |
| 2014/0209108 A1* | 7/2014 | Li .................... A24F 47/008 131/329 |
| 2014/0261408 A1 | 9/2014 | DePiano et al. |
| 2014/0261489 A1 | 9/2014 | Cadieux et al. |
| 2014/0283858 A1* | 9/2014 | Liu .................... A24F 47/008 131/329 |
| 2014/0311506 A1* | 10/2014 | Liu .................... A24F 47/008 131/329 |
| 2014/0334804 A1 | 11/2014 | Choi |
| 2014/0352707 A1* | 12/2014 | Liu .................... A24F 47/008 131/329 |
| 2014/0366895 A1 | 12/2014 | Li et al. |
| 2015/0020826 A1* | 1/2015 | Liu .................... A24F 47/008 131/329 |
| 2015/0020827 A1* | 1/2015 | Liu .................... A24F 47/008 131/329 |
| 2015/0027457 A1* | 1/2015 | Janardhan .................... A24F 47/008 131/328 |
| 2015/0150306 A1* | 6/2015 | Chen .................... A24F 47/008 131/329 |
| 2015/0181941 A1* | 7/2015 | Liu .................... A24F 47/008 131/329 |
| 2015/0184846 A1* | 7/2015 | Liu .................... F22B 1/284 131/329 |
| 2015/0196056 A1* | 7/2015 | Liu .................... H05B 1/0244 131/328 |
| 2015/0257448 A1* | 9/2015 | Lord .................... A24F 47/008 700/90 |
| 2015/0296884 A1* | 10/2015 | Liu .................... A24F 47/008 131/329 |
| 2016/0044962 A1* | 2/2016 | Thorens .................... A24F 47/008 392/395 |
| 2016/0206003 A1 | 7/2016 | Yamada et al. |
| 2016/0242466 A1 | 8/2016 | Lord et al. |
| 2016/0270442 A1* | 9/2016 | Liu .................... A24F 47/008 |
| 2016/0286859 A1* | 10/2016 | Liu .................... A24F 47/008 |
| 2016/0295918 A1* | 10/2016 | Liu .................... A24F 47/008 |
| 2016/0295924 A1* | 10/2016 | Liu .................... A24F 47/008 |

FOREIGN PATENT DOCUMENTS

| | | | |
|---|---|---|---|
| CA | 2 752 255 | 8/2010 | |
| CN | 1541577 | 11/2004 | |
| CN | 2719043 | 8/2005 | |
| CN | 200997909 | 1/2008 | |
| CN | 101116542 | 2/2008 | |
| CN | 101176805 | 5/2008 | |
| CN | 201379072 | 1/2010 | |
| CN | 202262413 U | 6/2012 | |
| CN | 202697716 U * | 1/2013 | ........... A24F 47/008 |
| DE | 10 2006 004 484 | 8/2007 | |
| DE | 102006041042 | 3/2008 | |
| DE | 20 2009 010 400 | 11/2009 | |
| EP | 0 295 122 | 12/1988 | |
| EP | 0 430 566 | 6/1991 | |
| EP | 0 845 220 | 6/1998 | |
| EP | 1 618 803 | 1/2006 | |
| EP | 2 316 286 | 5/2011 | |
| EP | 2 468 116 | 6/2012 | |
| EP | 2 862 458 | 4/2015 | |
| GB | 1444461 | 7/1976 | |
| GB | 2469850 | 11/2010 | |
| KR | 10-2011-0084387 | 7/2011 | |
| KR | 10-2012-0132005 | 12/2012 | |
| WO | WO 1986/02528 | 5/1986 | |
| WO | WO 1997/48293 | 12/1997 | |
| WO | 9857556 A1 | 12/1998 | |
| WO | WO 02/37990 | 5/2002 | |
| WO | WO 2004/043175 | 5/2004 | |
| WO | WO 2005/099494 | 10/2005 | |
| WO | WO 2007/078273 | 7/2007 | |
| WO | WO 2007/131449 | 11/2007 | |
| WO | WO 2009/105919 | 9/2009 | |
| WO | WO 2009/155734 | 12/2009 | |
| WO | WO 2010/003480 | 1/2010 | |
| WO | WO 2010/045670 | 4/2010 | |
| WO | WO 2010/073122 | 7/2010 | |
| WO | WO 2010/091593 | 8/2010 | |
| WO | WO 2010/118644 | 10/2010 | |
| WO | WO 2010/140937 | 12/2010 | |
| WO | WO 2011/010334 | 1/2011 | |

(56) References Cited

FOREIGN PATENT DOCUMENTS

| | | |
|---|---|---|
| WO | WO 2011/081558 | 7/2011 |
| WO | WO 2012/072762 | 6/2012 |
| WO | WO 2012/100523 | 8/2012 |
| WO | WO 2013/020220 | 2/2013 |
| WO | WO 2013/089551 | 6/2013 |
| WO | 2013/116558 A1 | 8/2013 |
| WO | WO 2013/147492 | 10/2013 |

OTHER PUBLICATIONS

International Search Report and Written Opinion of the International Searching Authority for corresponding International Application No. PCT/US2015/014071 dated Jun. 1, 2015.
First Chinese Office Action, Application No. 201580014324.3, dated Jun. 4, 2018.

* cited by examiner

AEROSOL DELIVERY DEVICE COMPRISING MULTIPLE OUTER BODIES AND RELATED ASSEMBLY METHOD

CROSS-REFERENCE TO RELATED APPLICATIONS

This application is a continuation in part of U.S. patent application Ser. No. 14/170,838, filed Feb. 3, 2014, which is incorporated herein by reference in its entirety.

FIELD OF THE DISCLOSURE

The present disclosure relates to aerosol delivery devices such as smoking articles, and more particularly, to aerosol delivery devices that include multiple outer bodies. The aerosol delivery devices incorporate an aerosol formation device or an atomizer A typical atomizer is configured to heat an aerosol precursor including components that may be made or derived from tobacco or otherwise incorporate tobacco using an electrically powered resistance heater. As a result, the aerosol delivery device provides an inhalable substance for human consumption.

BACKGROUND

Many smoking devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 7,726,320 to Robinson et al., U.S. Pat. Pub. No. 2013/0255702 to Griffith Jr. et al., U.S. Pat. Pub. No. 2014/0000638 to Sebastian et al., U.S. Pat. Pub. No. 2014/0060554 to Collett et al., U.S. Pat. Pub. No. 2014/0096781 to Sears et al., U.S. Pat. Pub. No. 2014/0096782 to Ampolini et al., and U.S. patent application Ser. No. 14/011,992 to Davis et al., filed Aug. 28, 2013, which are incorporated herein by reference in their entirety.

Certain existing embodiments of aerosol delivery devices include a single, unitary, elongated outer housing that is substantially tubular in shape. In these embodiments, all of the components of the aerosol delivery device are at least partially contained within the single outer housing. However, it would be desirable to provide an alternate form or configuration of an aerosol delivery device that enhances user experience or allows for alternative manufacturing techniques. Thus, advances with respect to configurations of aerosol delivery devices and methods of assembly thereof may be desirable.

BRIEF SUMMARY OF THE DISCLOSURE

The present disclosure relates to aerosol delivery devices configured to produce aerosol. Certain types of these devices can be characterized as electronic cigarettes. In one aspect an aerosol delivery device is provided. The aerosol delivery device may include a first outer body defining an inlet aperture, a second outer body, a power source positioned in the first outer body, an atomizer positioned in the second outer body, and a coupler positioned between, and engaged with, the first outer body and the second outer body. The coupler may define a coupler inlet and a longitudinal channel. The coupler may be configured to receive air from the inlet aperture defined in the first outer body through the coupler inlet and to direct the air through the longitudinal channel to the second outer body.

In some embodiments the aerosol delivery device may further include at least one securing mechanism configured to substantially irreversibly secure the first outer body to the second outer body. The at least one securing mechanism may be a wrapper extending at least partially around the first outer body, the second outer body, and the coupler. The aerosol delivery device may additionally include a reservoir substrate and a flow director positioned in the second outer body, the flow director may extend at least partially through the reservoir substrate. The flow director may define a transverse aperture extending therethrough, and the atomizer may extend through the transverse aperture.

In some embodiments a plurality of electrical connectors may extend from the atomizer through the coupler to the power source. The atomizer may include a heating element and a liquid transport element defining a center portion and first and second opposing arms extending therefrom, the heating element may be coupled to the center portion of the liquid transport element. The coupler may define a nipple and the flow director may engage the nipple of the coupler. Accordingly, the positioning of the components is such that an airflow passageway is created.

In some embodiments the aerosol delivery device may additional include a mouthpiece defining a nipple, and the flow director may engage the nipple of the mouthpiece. The coupler may define a rib, and the rib may separate the first outer body from the second outer body. One of the first outer body and the second outer body may define an inlet aperture aligned with a recessed portion of the coupler.

In an additional aspect, a method for assembling an aerosol delivery device is provided. The method may include positioning a power source in a first outer body defining an inlet aperture, positioning an atomizer in a second outer body, and engaging a coupler defining a coupler inlet and a longitudinal channel with the first outer body and the second outer body such that the coupler is positioned to receive air from the inlet aperture defined in the first outer body through the coupler inlet and to direct the air through the longitudinal channel to the second outer body.

In some embodiments, the method may further include substantially irreversibly securing the first outer body to the second outer body with a securing mechanism. Substantially irreversibly securing the first outer body to the second outer body with the securing mechanism may include wrapping a wrapper at least partially around the first outer body, the second outer body, and the coupler. The method may additionally include positioning a reservoir substrate and a flow director in the second outer body such that the flow director extends at least partially through the reservoir substrate. Positioning the atomizer in the second outer body may include inserting the atomizer through a transverse aperture extending through the flow director.

In some embodiments the method may additionally include inserting a plurality of electrical connectors through the coupler and connecting the electrical connectors to the power source and the atomizer. Additionally, the method may include coupling a heating element to a center portion of a liquid transport element to form the atomizer and folding first and second opposing arms of the liquid transport element extending from the center section away from the coupler. Further, the method may include coupling the flow director to a nipple of the coupler. The method may also include coupling the flow director to a nipple of a mouthpiece. Engaging the coupler with the first outer body and the second outer body may include engaging a rib of the coupler with the first outer body and the second outer body. Engaging the coupler with the first outer body may include aligning an inlet aperture defined through the first outer body with a recessed portion of the coupler.

In an additional embodiment a coupler for an aerosol delivery device is provided. The coupler may include a first engagement portion configured to engage a first outer body, a second engagement portion configured to engage a second outer body, a coupler inlet defined through a peripheral surface of the first engagement portion, and a longitudinal channel in fluid communication with the coupler inlet and extending through the second engagement portion to a coupler outlet opening.

In some embodiments the coupler may additionally include a pressure port opening in fluid communication with at least one of the coupler inlet and the longitudinal channel and extending through the first engagement portion. The coupler inlet may be defined between first and second grooves configured to respectively receive a gasket). Further, the coupler may include a recessed portion at the peripheral surface of the first engagement portion, and the coupler inlet may be defined through the recessed portion. Additionally, the coupler may include a nipple configured to engage a flow director, and the longitudinal channel may extend through the nipple.

In an additional embodiment an aerosol delivery device is provided. The aerosol delivery device may include a first outer body, a second outer body, a power source positioned in the first outer body, an atomizer positioned in the second outer body, and a coupler positioned between, and welded to, the first outer body and the second outer body. The coupler may define a coupler inlet and the coupler may be configured to receive air through the coupler inlet and to direct the air to the atomizer in the second outer body.

In some embodiments the aerosol delivery device may additionally include a reservoir substrate and a flow director positioned in the second outer body. The flow director may extend at least partially through the reservoir substrate. The coupler may define a nipple and the flow director may engage the nipple of the coupler. Further, the aerosol delivery device may include a flow director fastener extending at least partially around the flow director proximate a slit defined through the flow director. The aerosol delivery device may include a mouthpiece assembly defining a nipple. The flow director may engage the nipple of the mouthpiece assembly. Additionally, the aerosol delivery device may include a substrate fastener extending at least partially around the flow director and the nipple of the mouthpiece assembly. The substrate fastener may be configured to retain the reservoir substrate in a selected position.

In some embodiments the atomizer may extend substantially linearly between first and second ends. The coupler may be laser welded to the first outer body and the second outer body. The coupler may define a rib. The rib may separate the first outer body from the second outer body. The coupler may further define a first engagement portion welded to the first outer body and a second engagement portion welded to the second outer body. The first engagement portion and the second engagement portion may be separated by the rib. The coupler may further define a recessed portion at a peripheral surface of the first engagement portion. The coupler inlet may be defined through the recessed portion.

The coupler may define one or more separator extensions and a pressure port proximate the first outer body and in fluid communication with the coupler inlet. The one or more separator extensions may be configured to prevent the power source from blocking the pressure port. The coupler may further define a longitudinal channel in fluid communication with the coupler inlet and the second outer body. The pressure port may extend into the longitudinal channel to resist leakage into the first outer body. The aerosol delivery device may additionally include a sealing member sealed against the coupler and one or more electrical connectors extending therethrough.

In an additional aspect a method for assembling an aerosol delivery device is provided. The method may include positioning a power source in a first outer body, positioning an atomizer in a second outer body, engaging a coupler defining a coupler inlet with the first outer body and the second outer body such that the coupler is positioned between the first outer body and the second outer body and configured to receive air through the coupler inlet and to direct the air to the second outer body, and welding the coupler to the first outer body and the second outer body.

In some embodiments the method may further include positioning a reservoir substrate and a flow director in the second outer body such that the flow director extends at least partially through the reservoir substrate. Additionally, the method may include coupling the flow director to a nipple of the coupler. Further, the method may include engaging a flow director fastener with the flow director such that the flow director fastener extends at least partially thereabout.

In some embodiments the method may further include coupling the flow director to a nipple of a mouthpiece assembly. Additionally, the method may include engaging a substrate fastener with the flow director such that the substrate fastener extends at least partially around the nipple of the mouthpiece assembly. Engaging the coupler with the first outer body and the second outer body may include engaging a rib of the coupler with the first outer body and the second outer body. Engaging the coupler with the first outer body and the second outer body may further include engaging the first outer body with a first engagement portion of the coupler and engaging the second outer body with a second engagement portion of the coupler, the first engagement portion and the second engagement portion being separated by the rib. Welding the coupler to the first outer body and the second outer body may include laser welding the coupler to the first outer body and the second outer body. The method may additionally include engaging a sealing member with the coupler and piercing the sealing member with one or more electrical connectors such that the one or more electrical connectors extend through and seal against the sealing member.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE FIGURES

Figure 1:
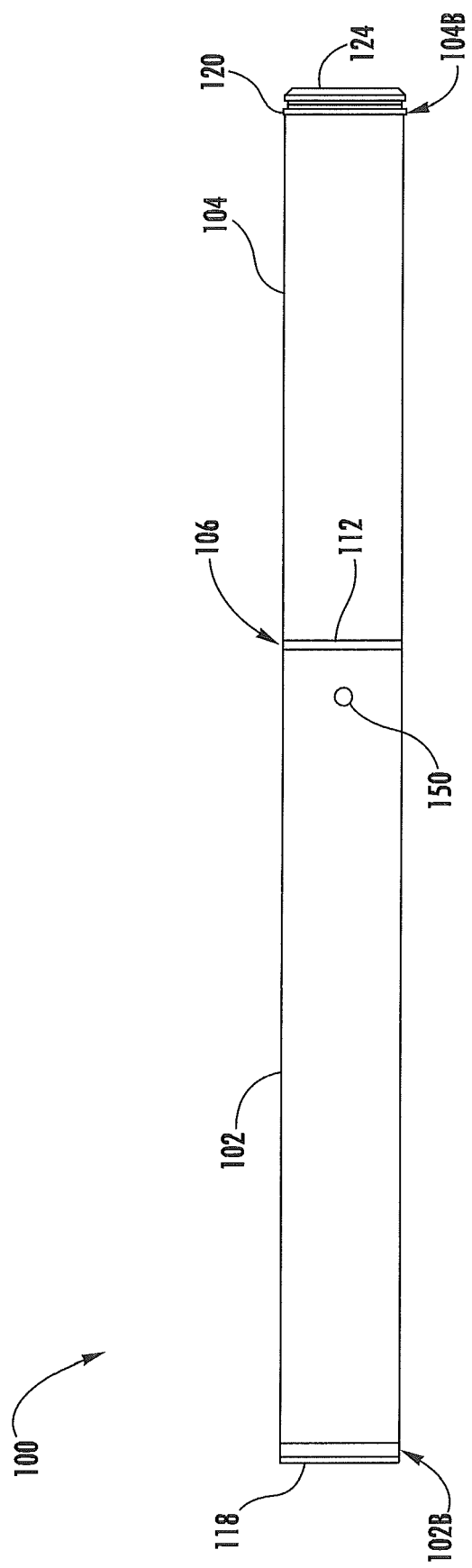
Figure 2:
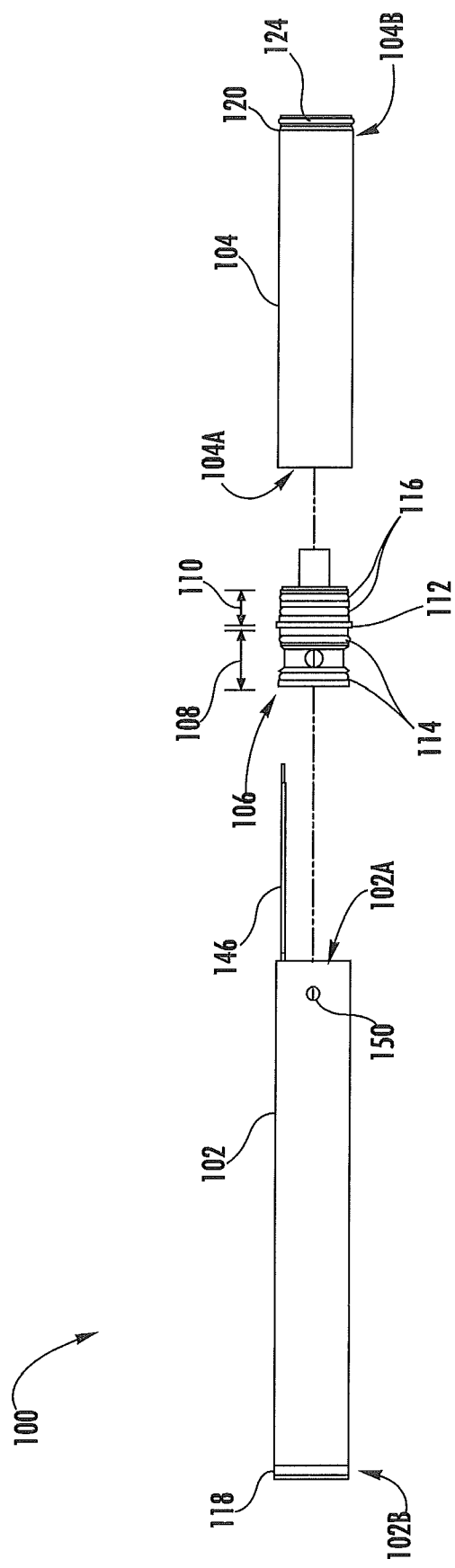
Figure 3:
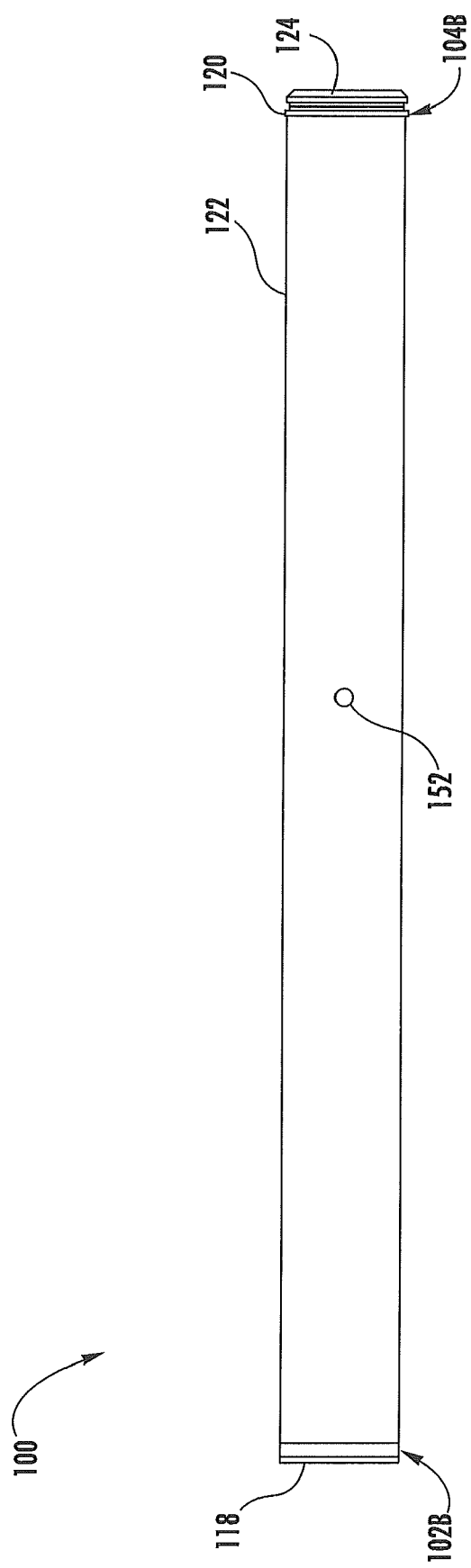
Figure 4:
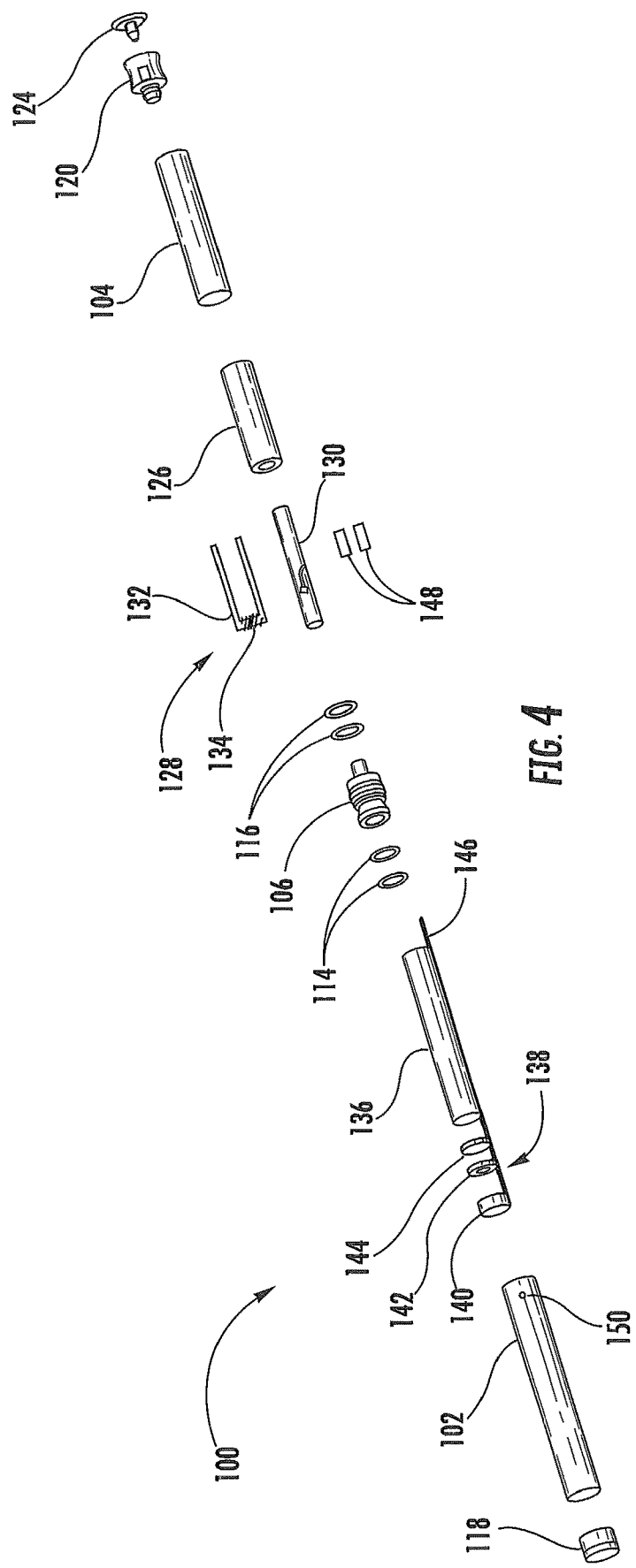
Figure 5:
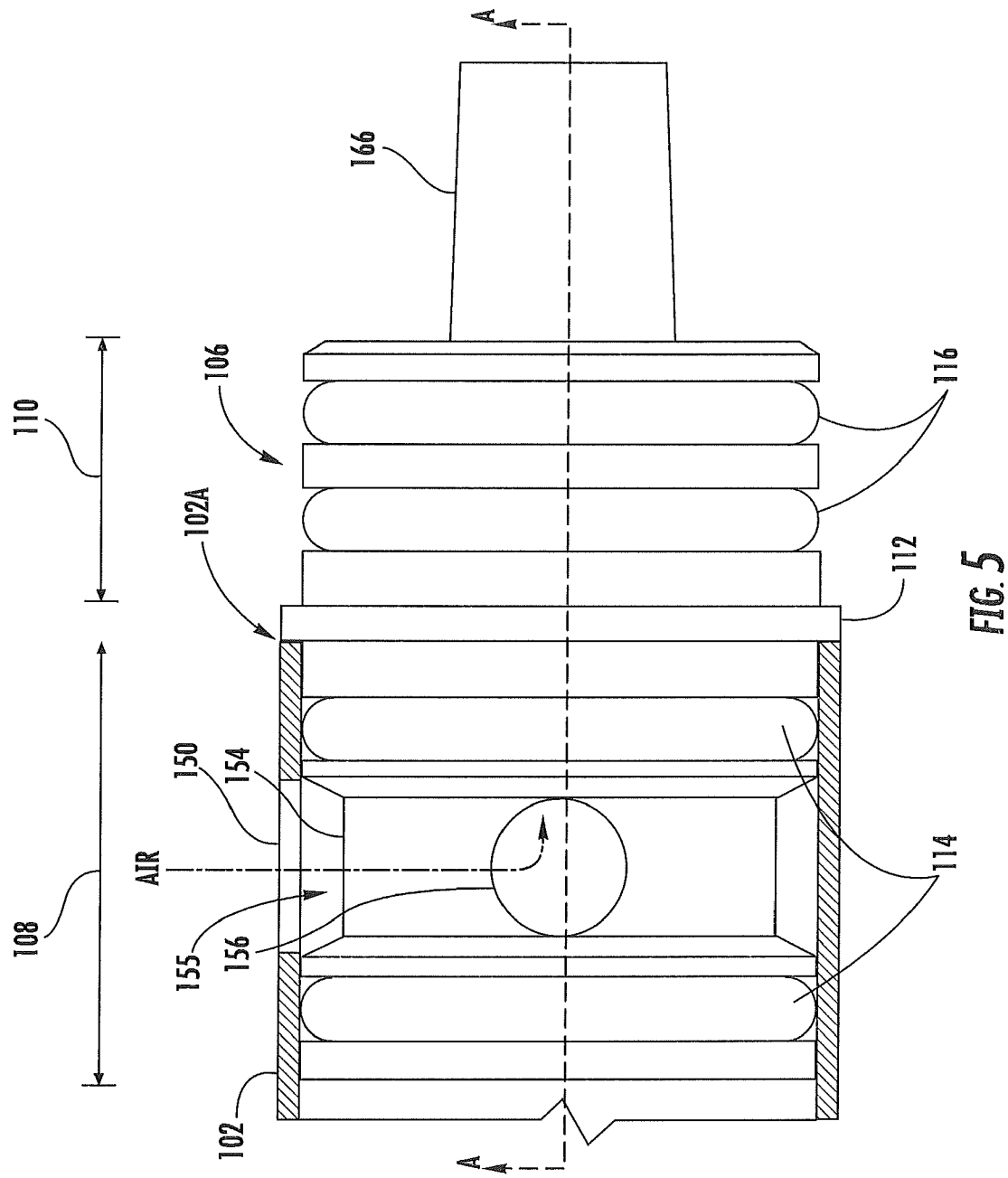
Figure 6:
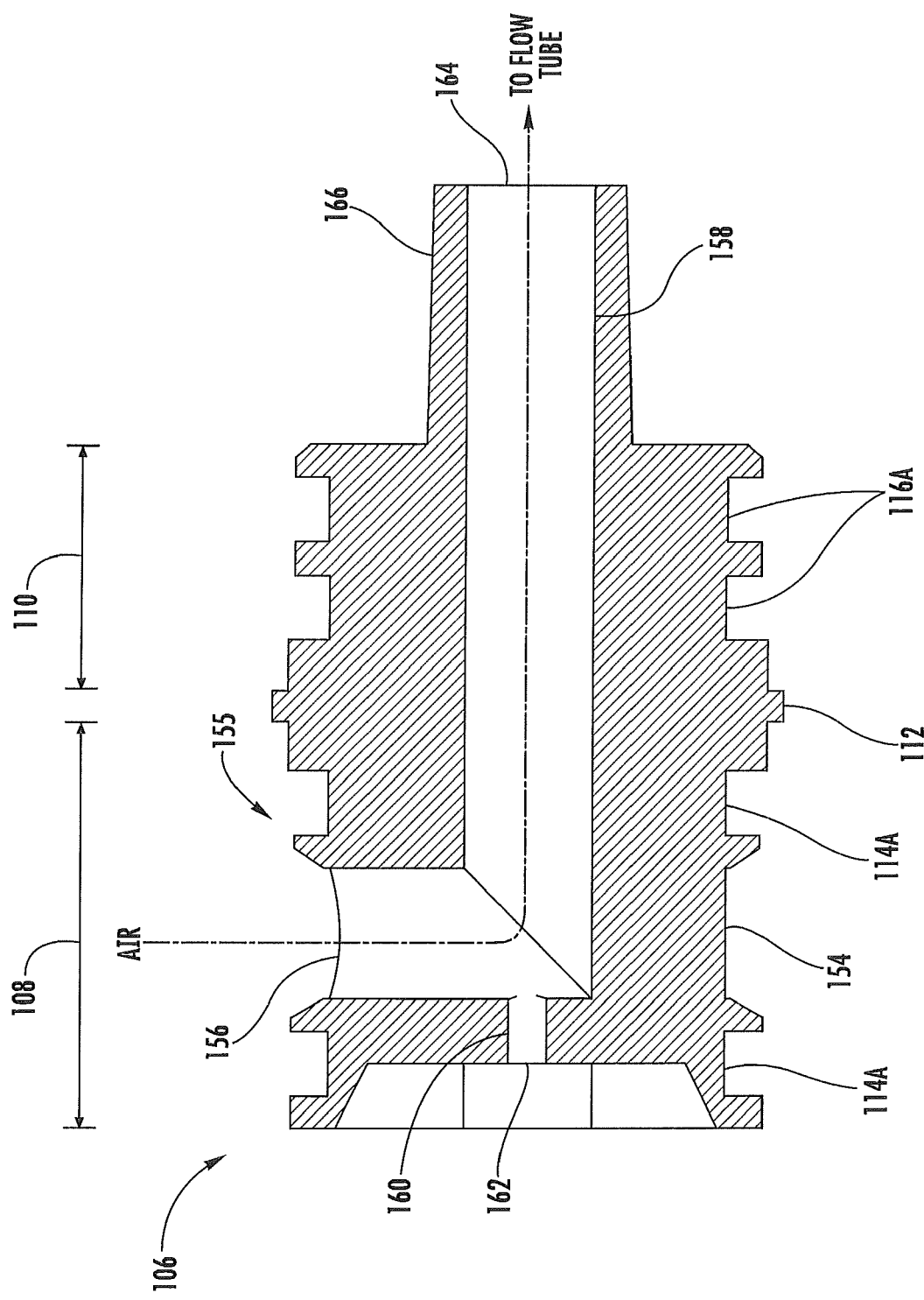
Figure 7:
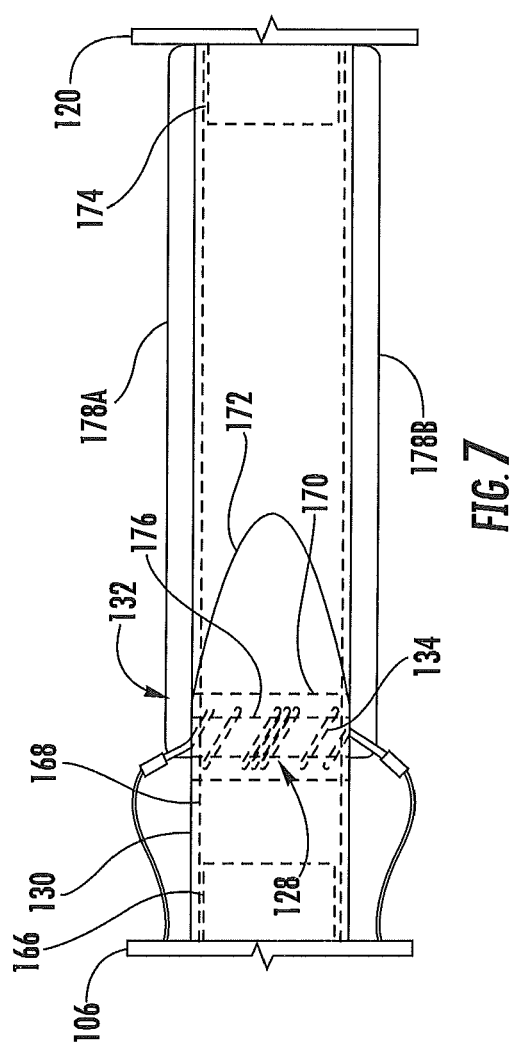
Figure 8:
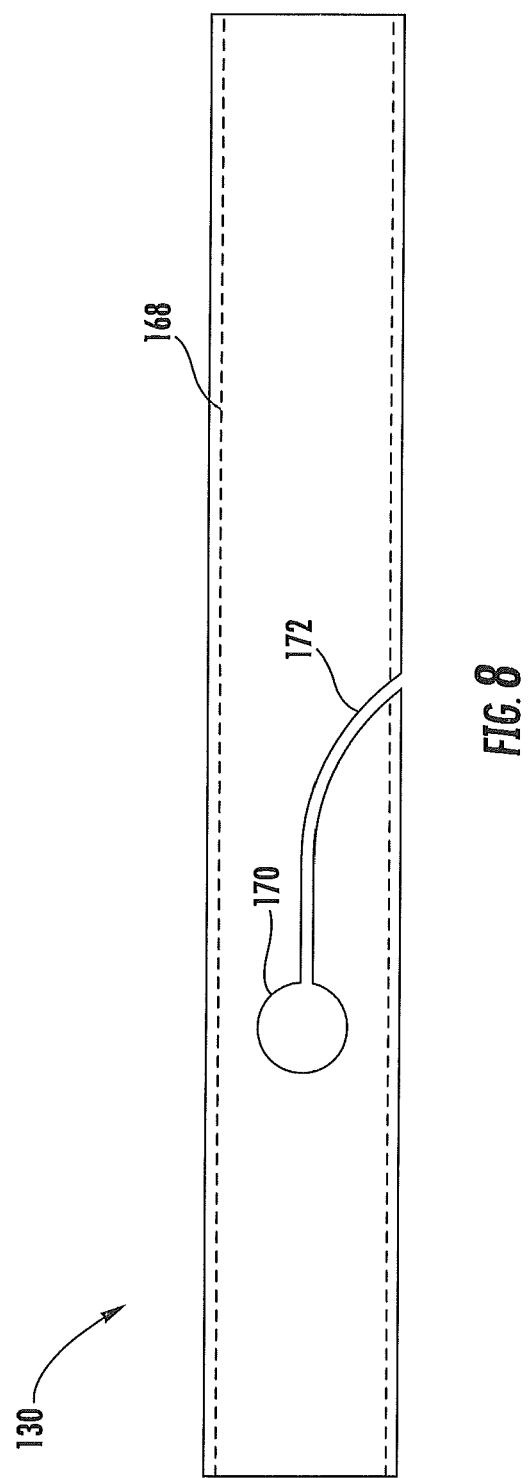
Figure 9:
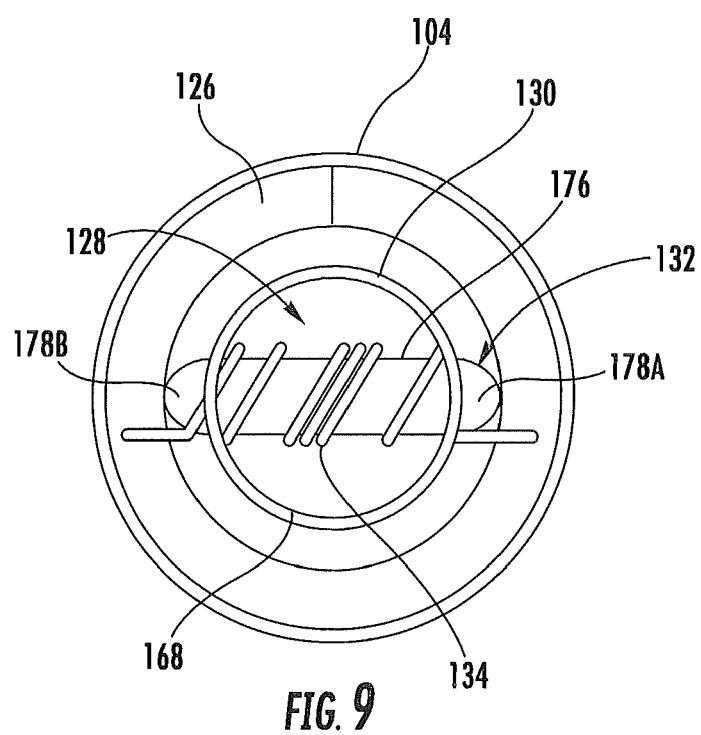
Figure 10:
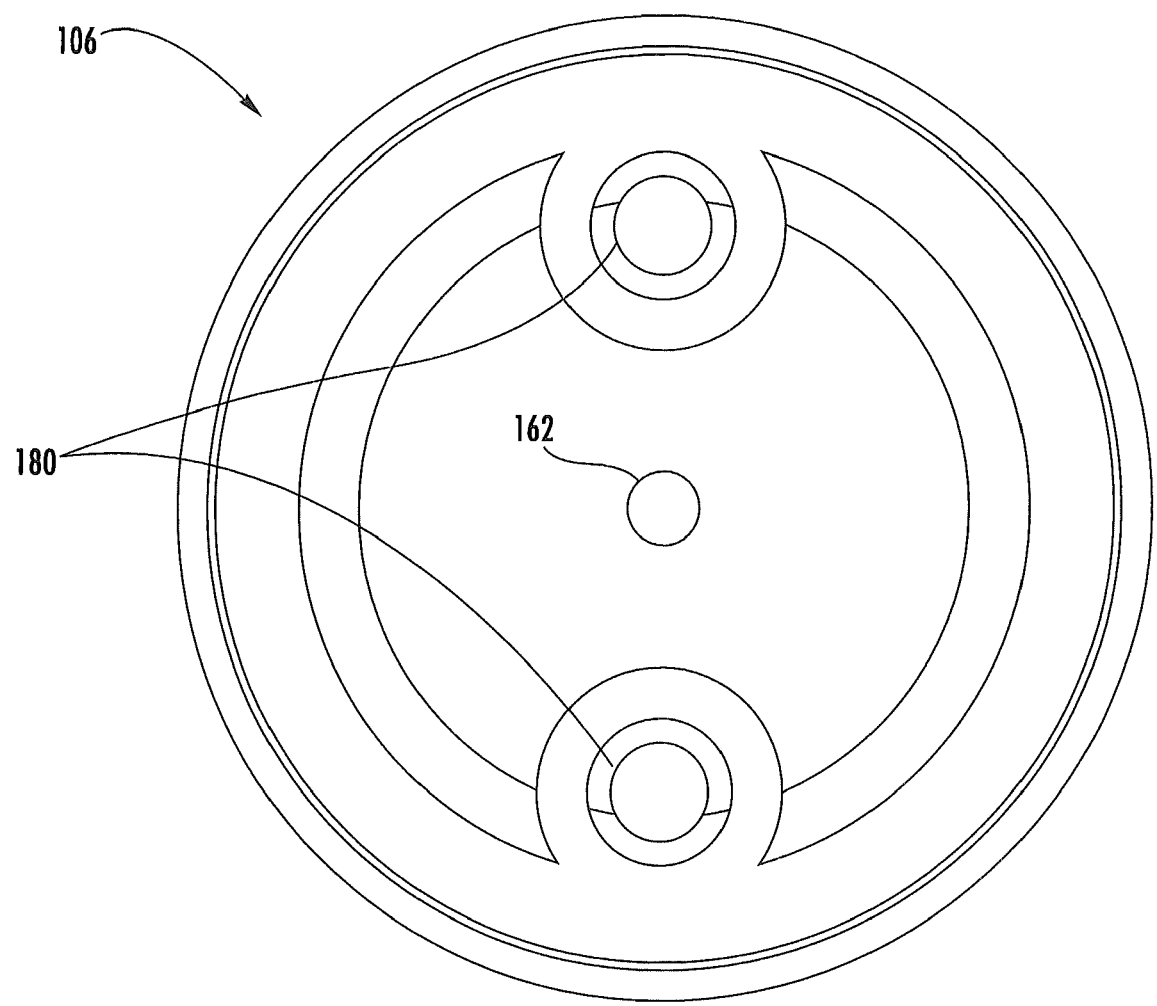
Figure 11:
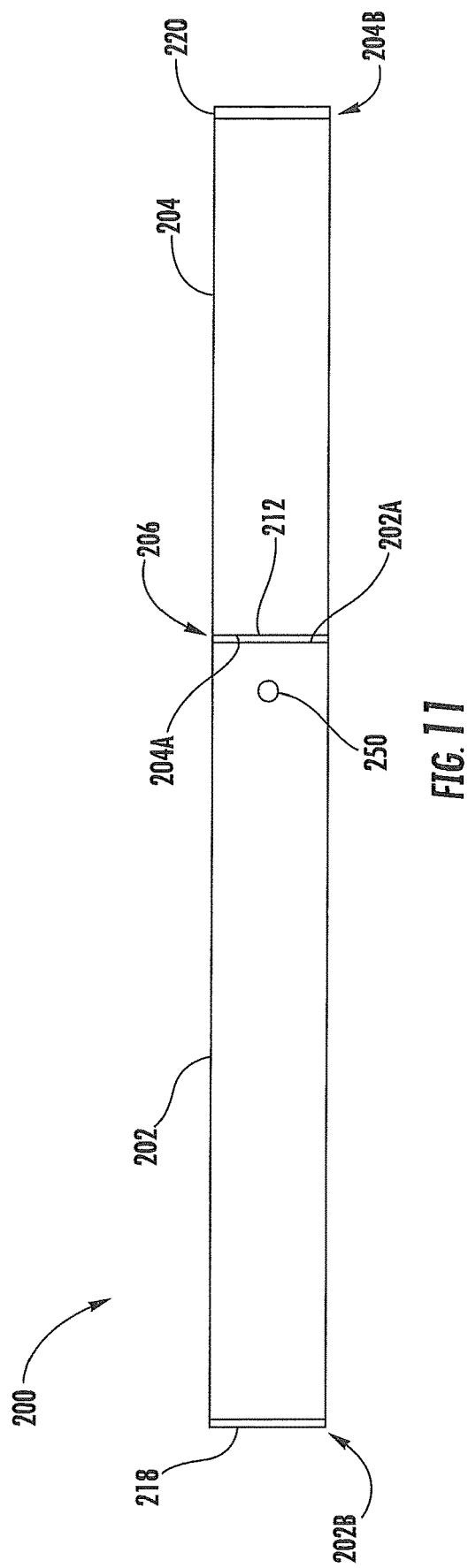
Figure 12:
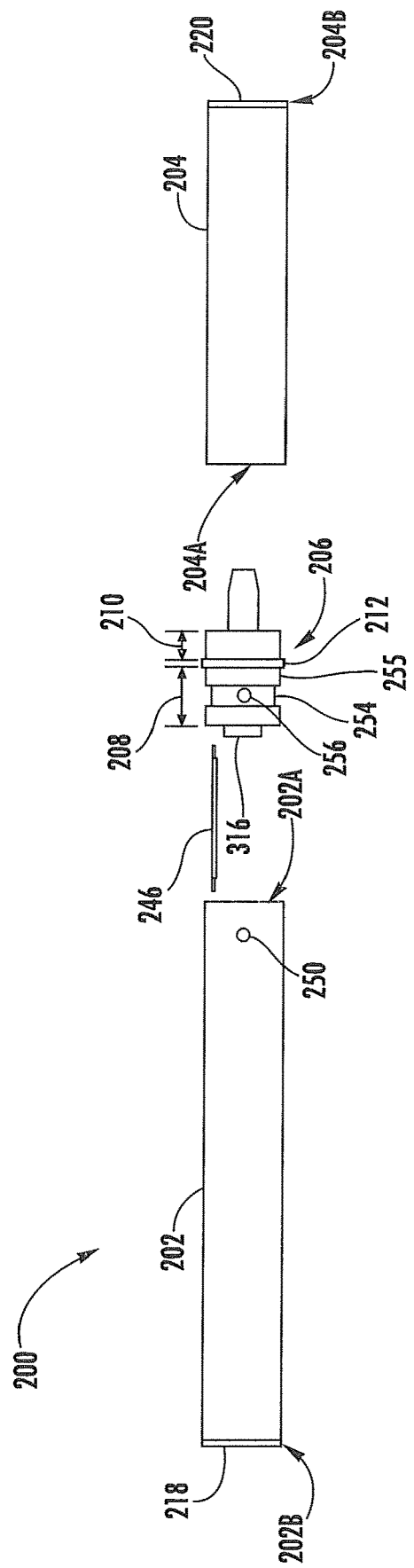
Figure 13:
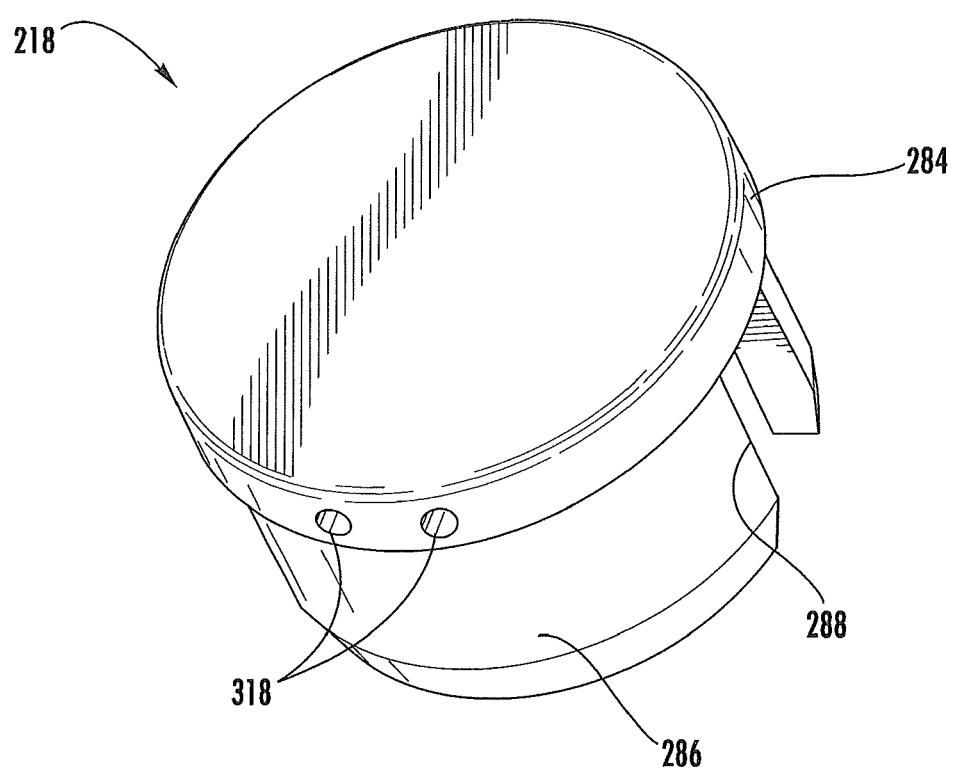
Figure 14:
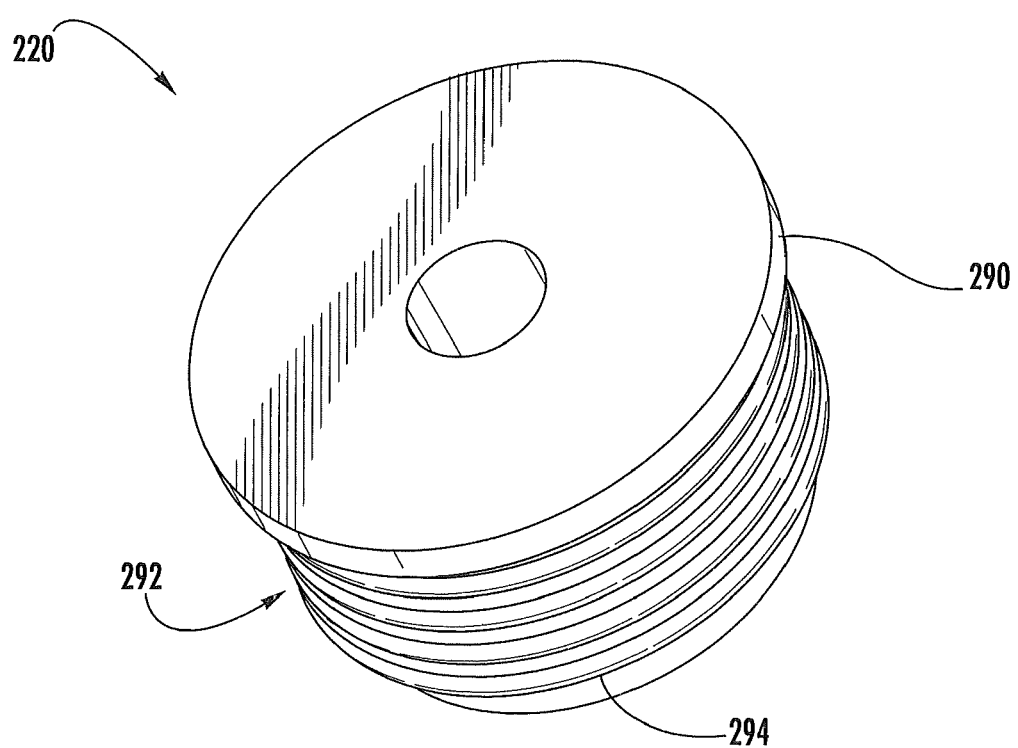
Figure 15:
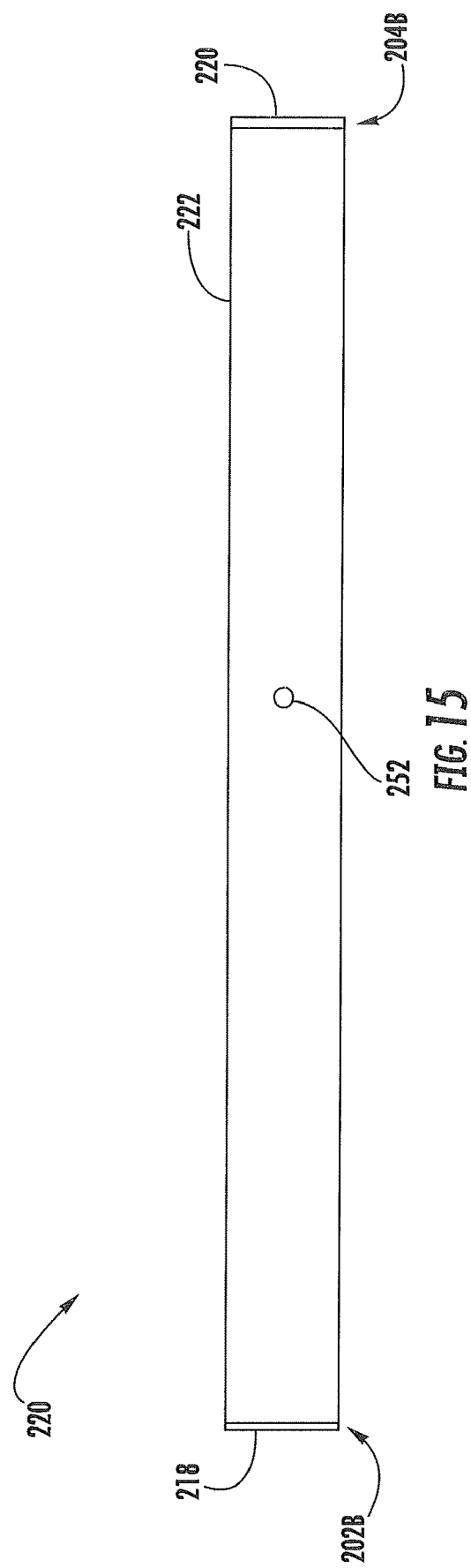
Figure 16:
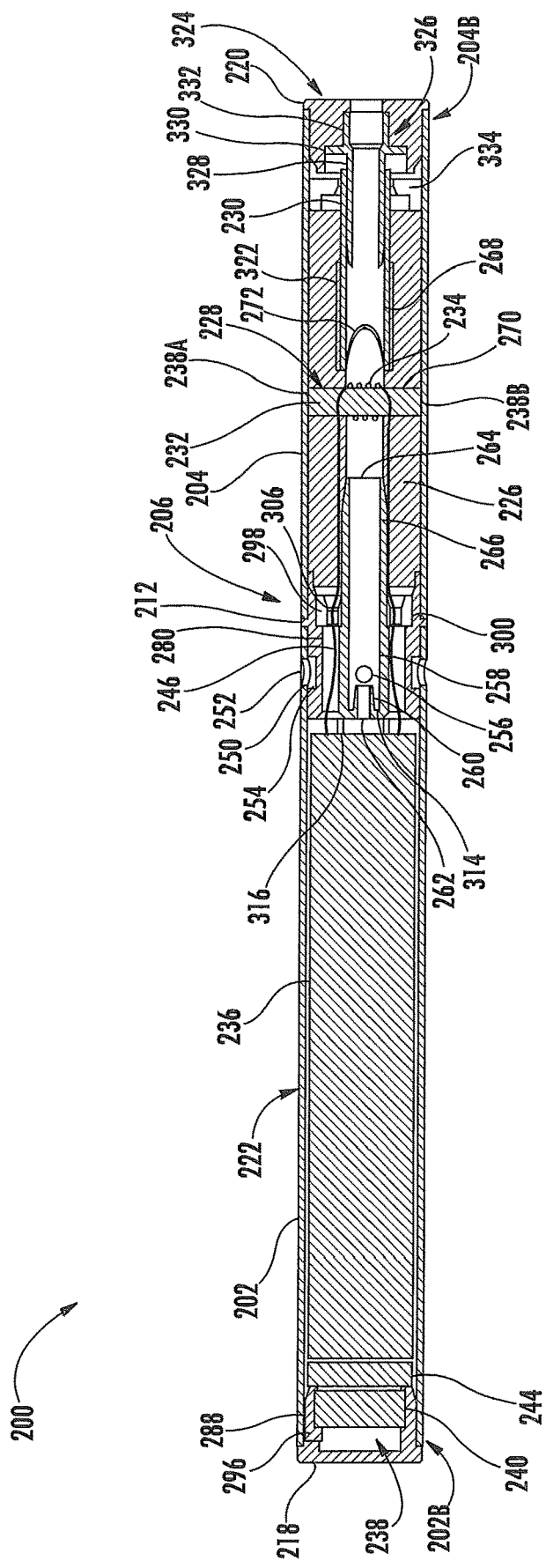
Figure 17:
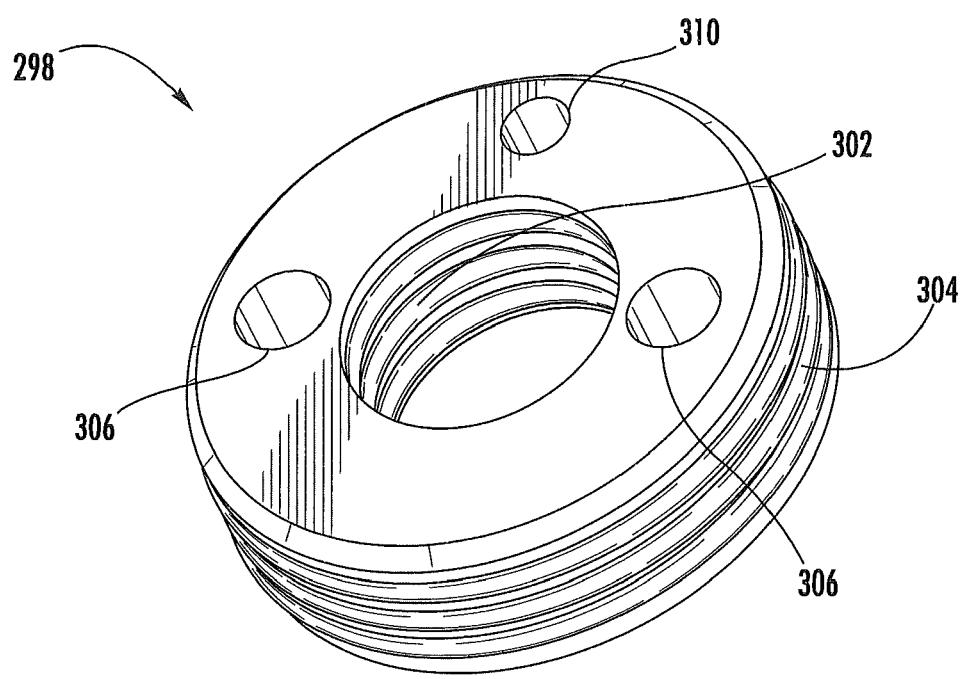
Figure 18:
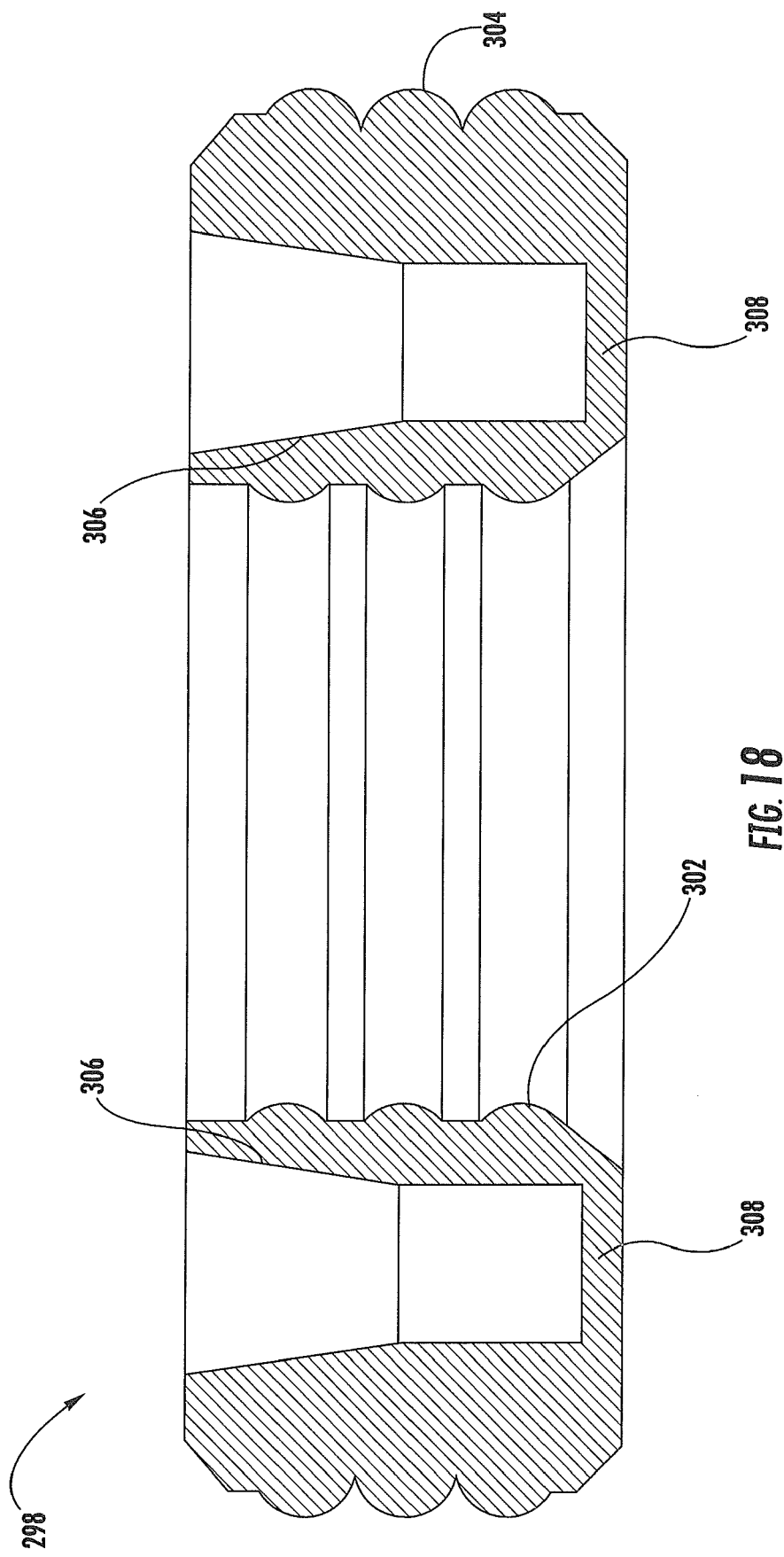
Figure 19:
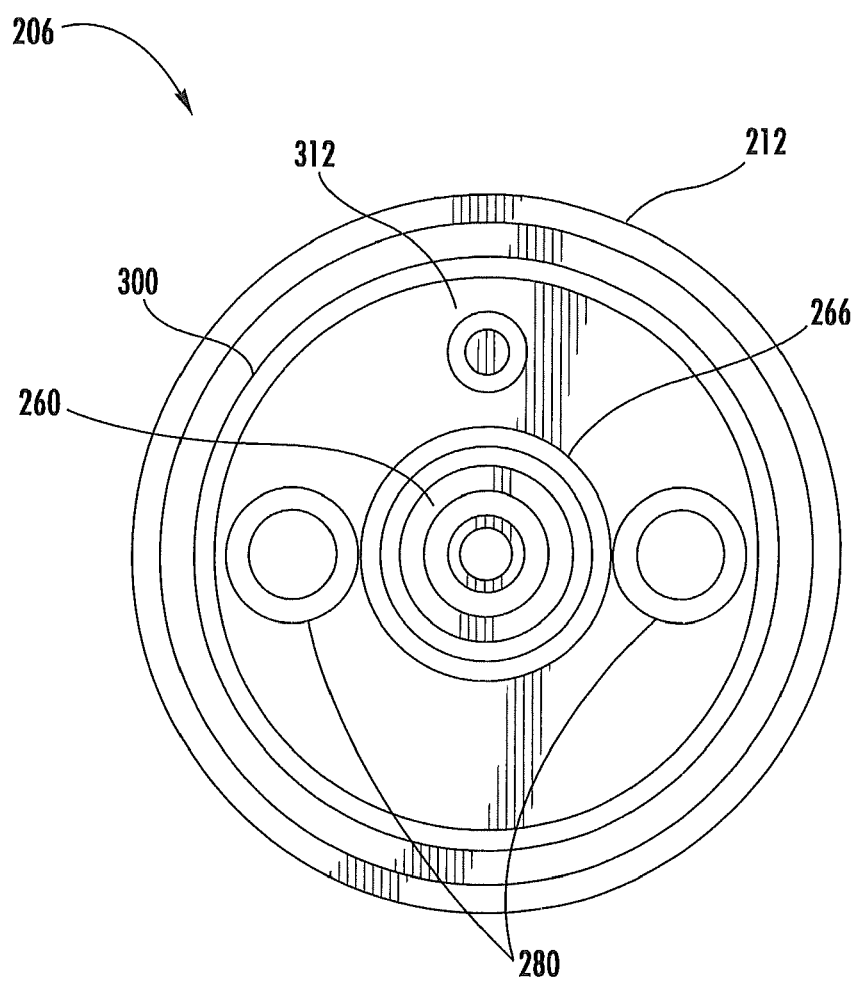
Figure 20:
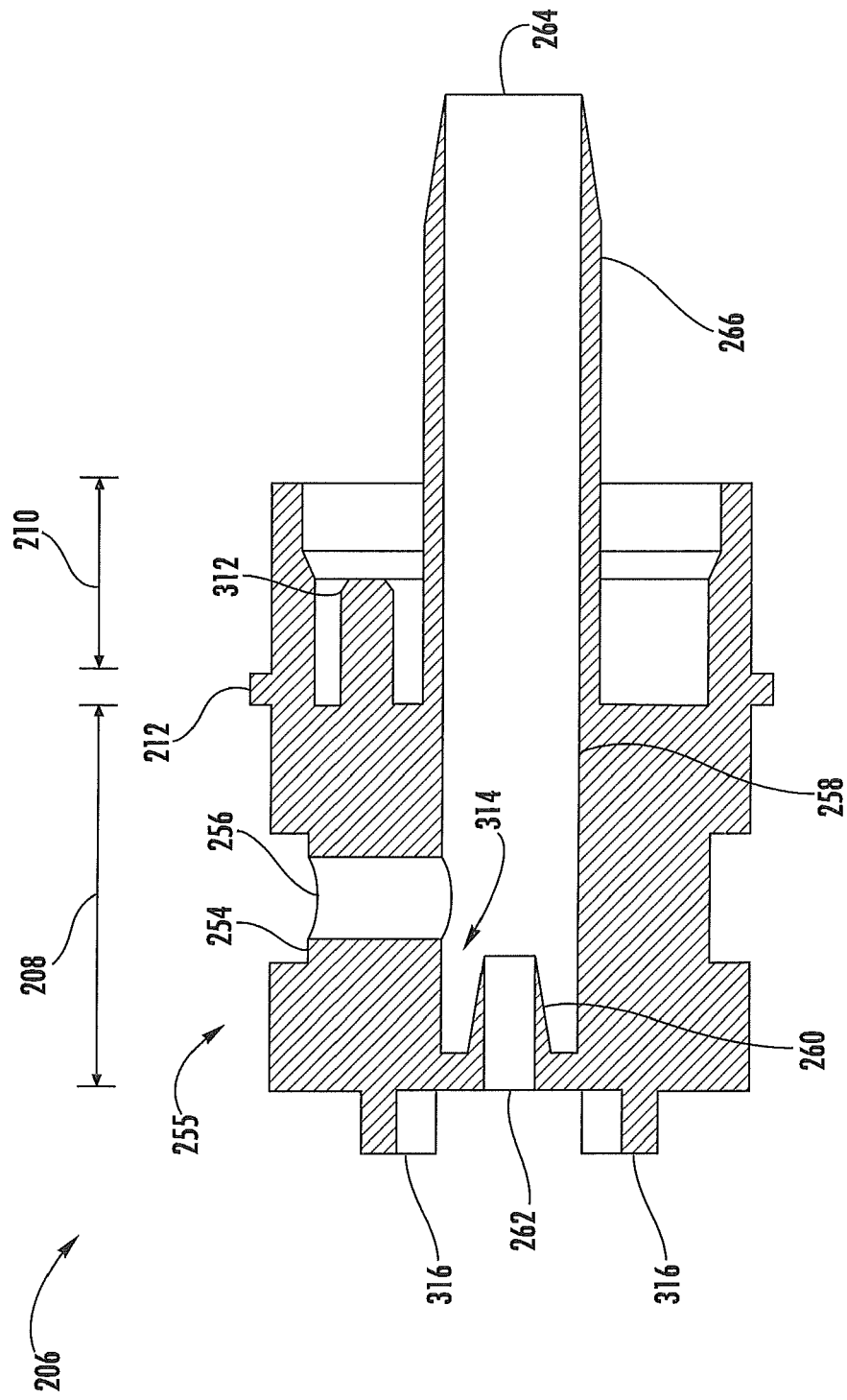
Figure 21:
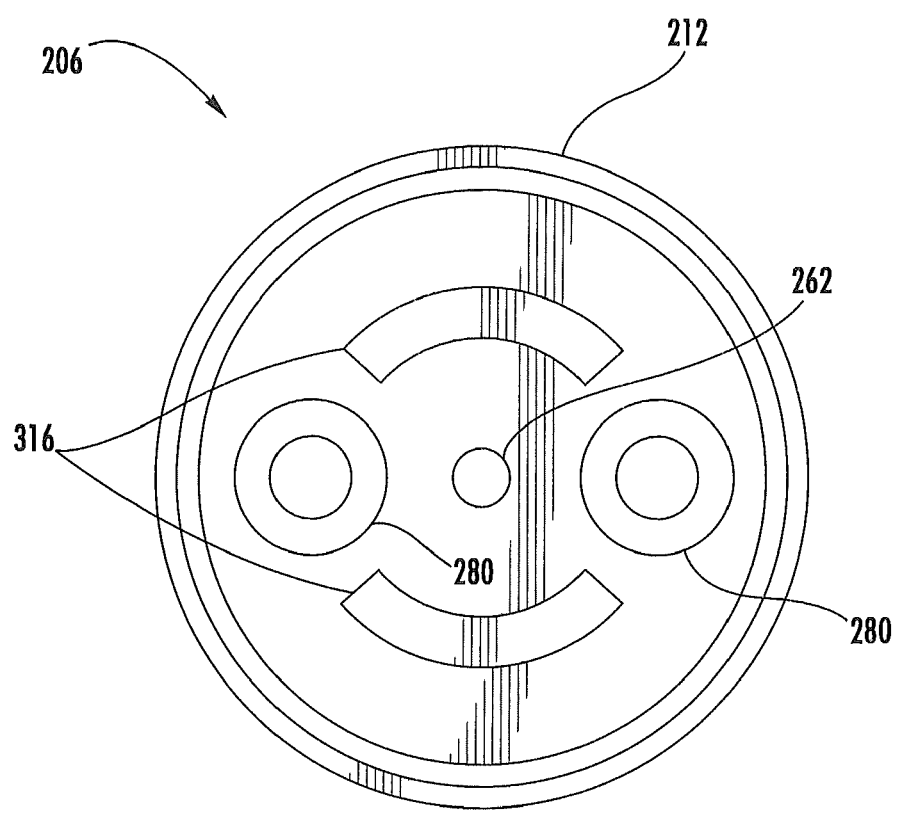
Figure 22:
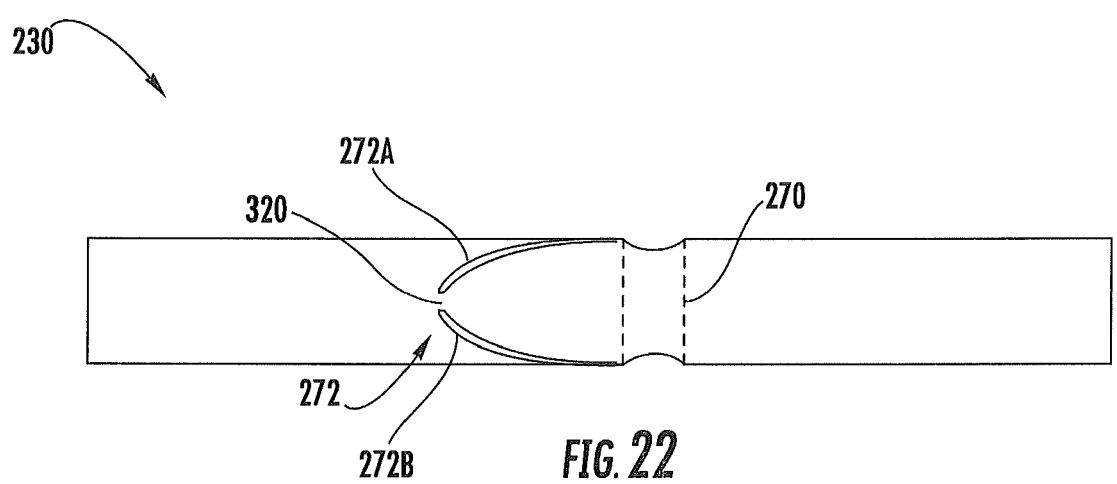
Figure 23:
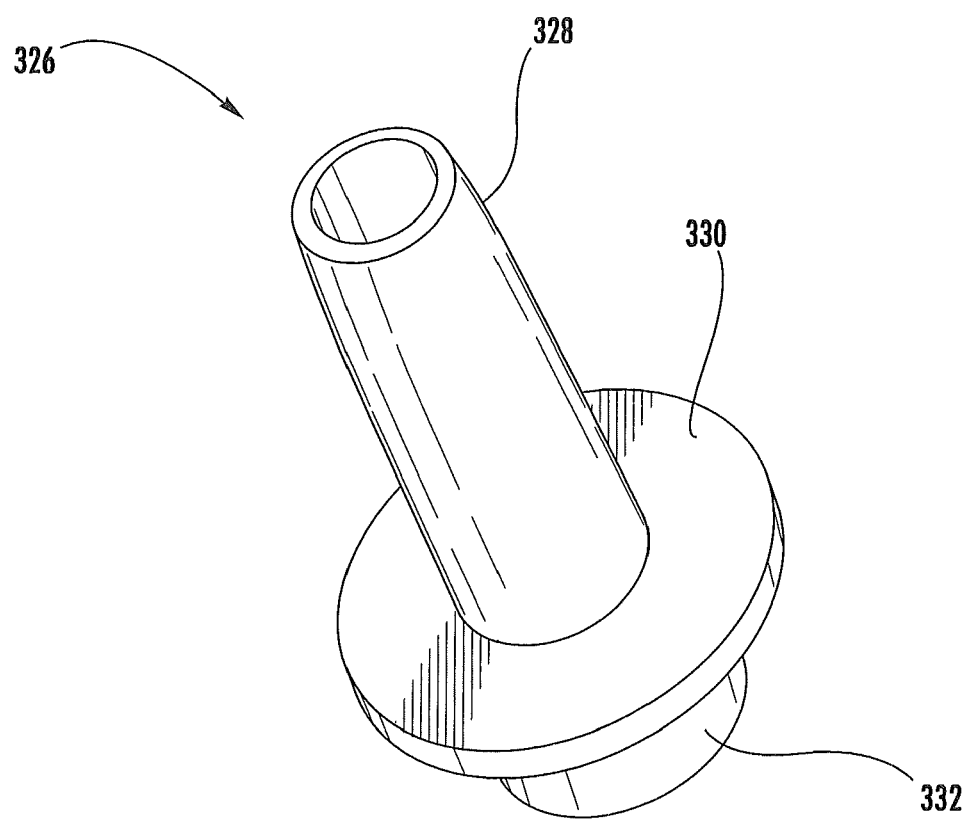
Figure 24:
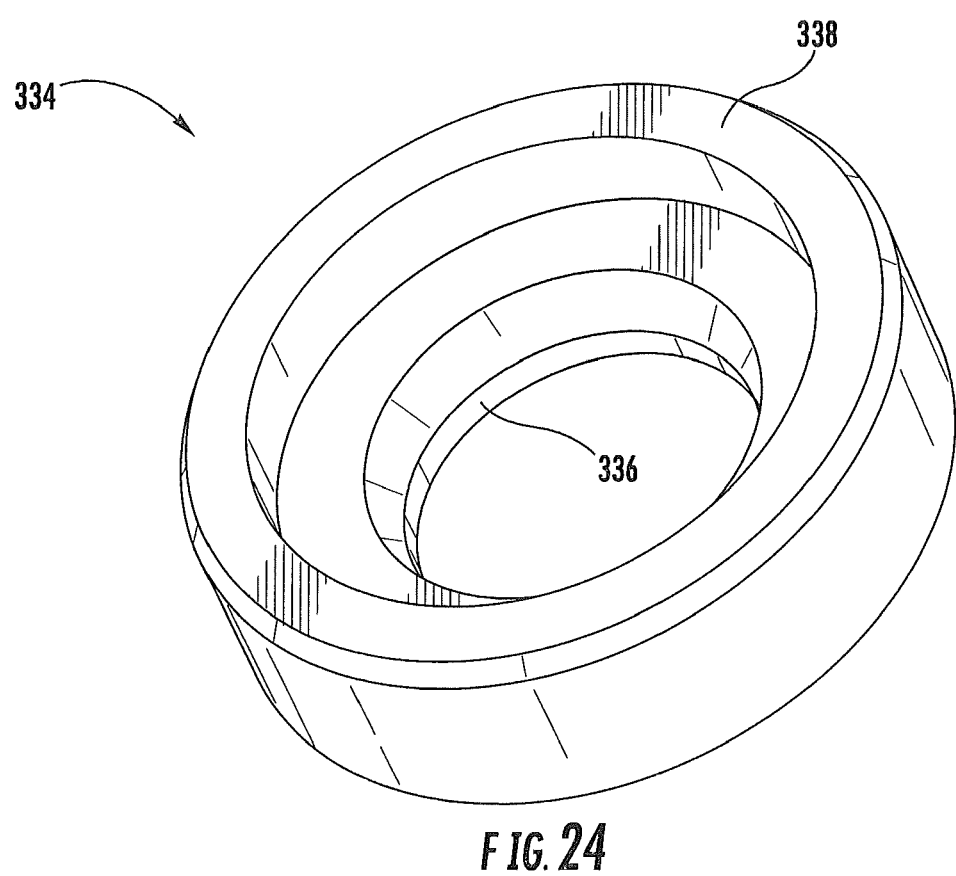
Figure 25:
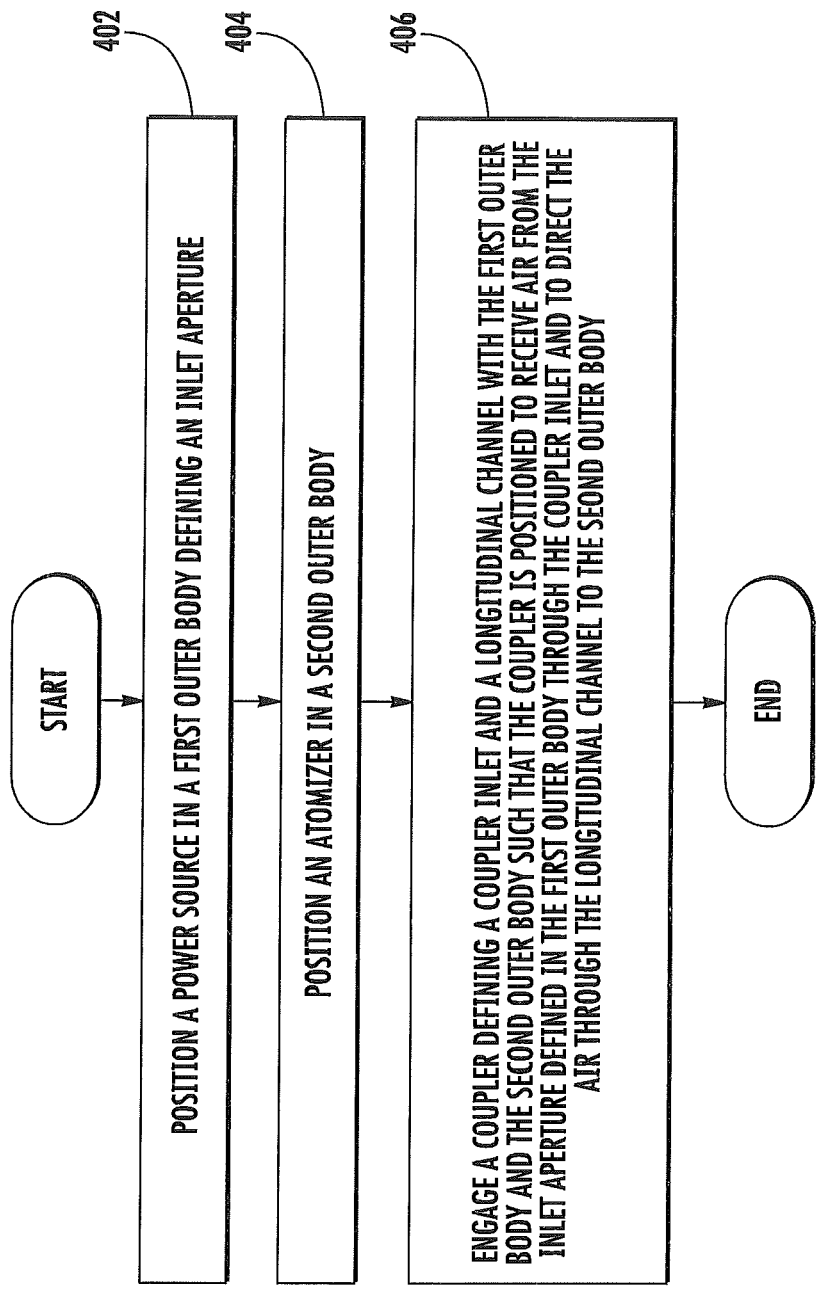
Figure 26:
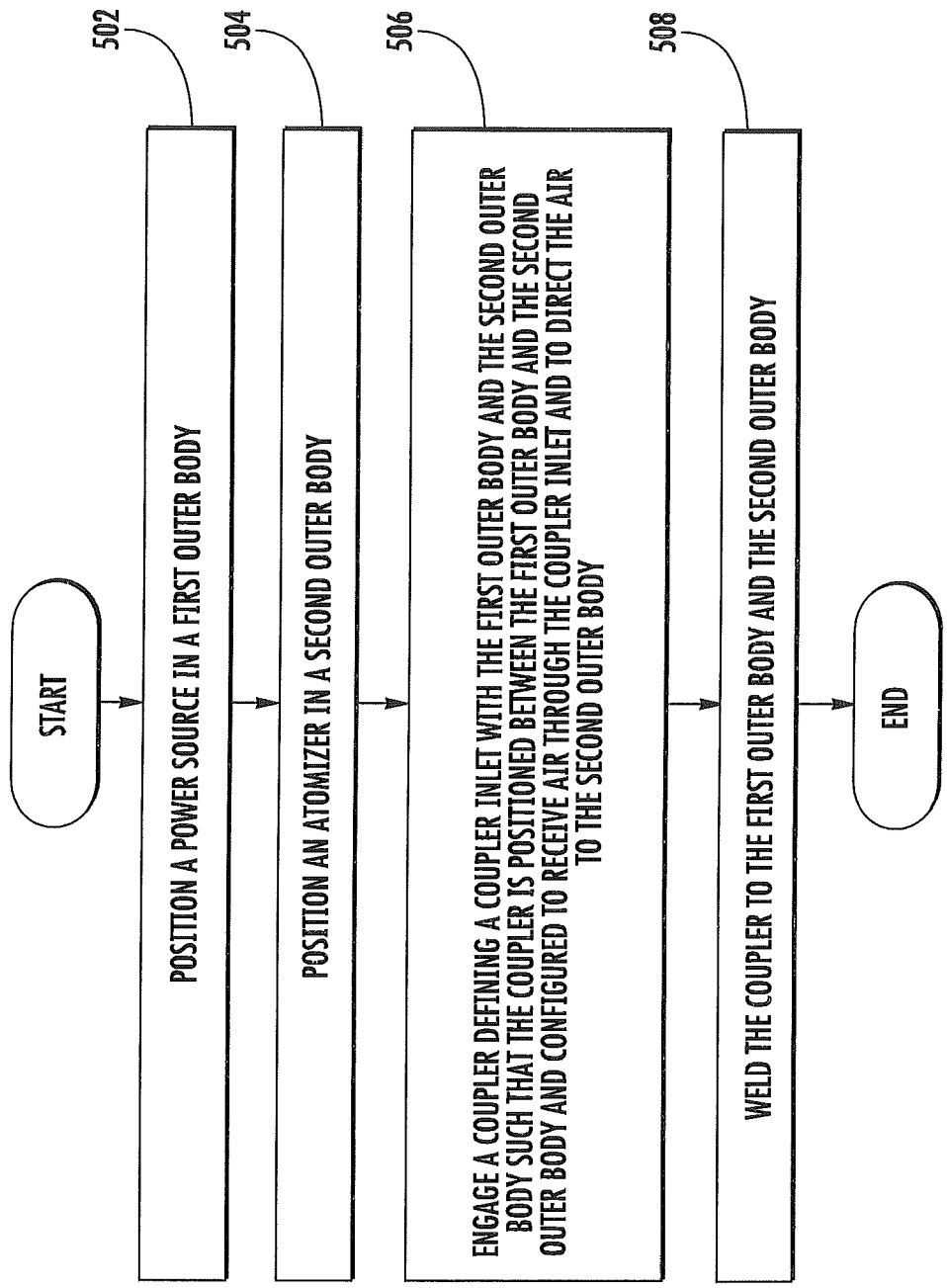
Figure 27:
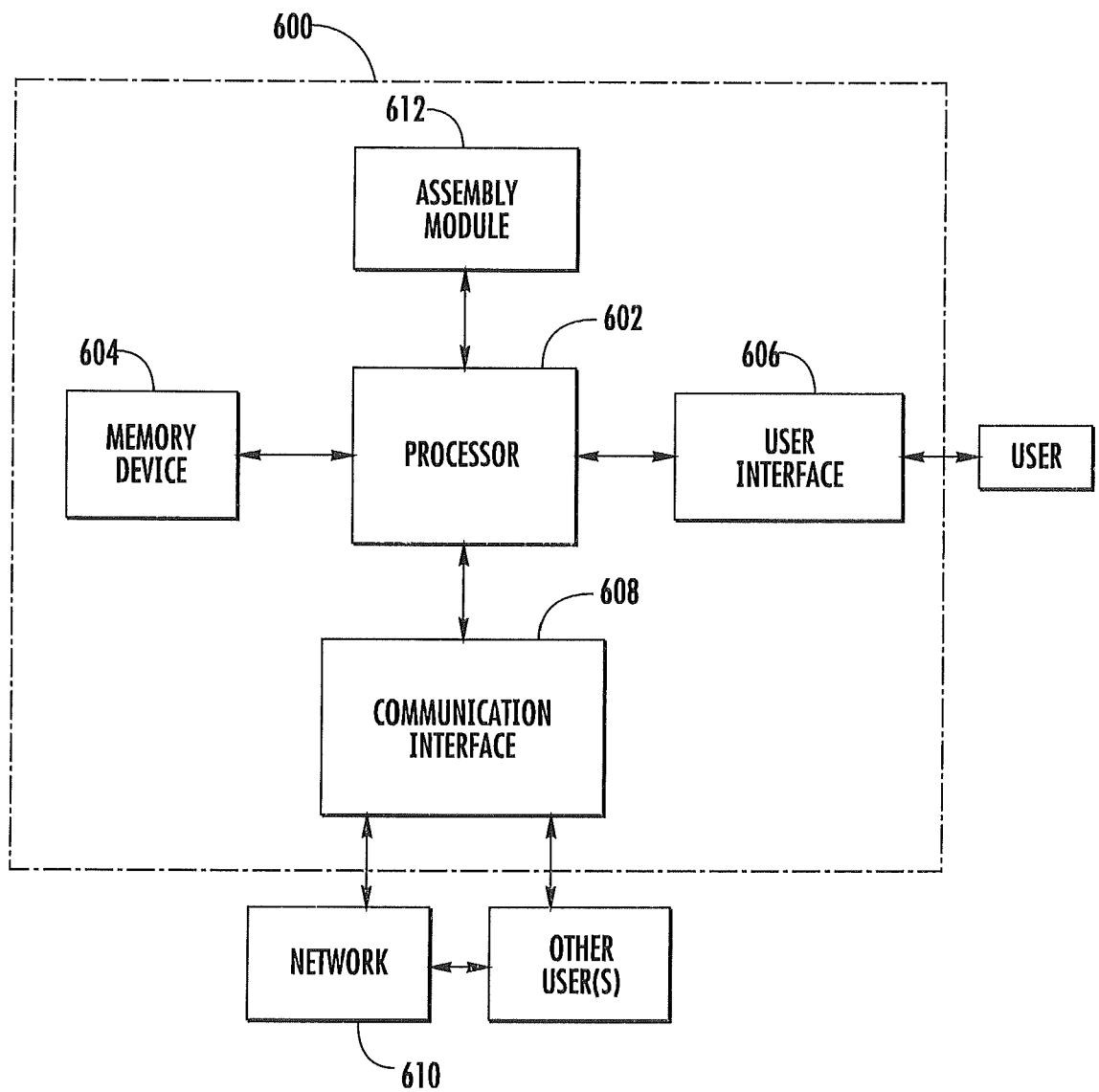

Having thus described the disclosure in the foregoing general terms, reference will now be made to the accompanying drawings, which are not necessarily drawn to scale, and wherein:

FIG. 1 illustrates a side view of an aerosol delivery device in an assembled configuration, the aerosol delivery device having the general configuration of what can be characterized as an electronic cigarette, and comprising a first outer body, a second outer body, and a coupler positioned therebetween according to an example embodiment of the present disclosure;

FIG. 2 illustrates a partially exploded side view of the aerosol delivery device of FIG. 1 according to an example embodiment of the present disclosure;

FIG. 3 illustrates a side view of the aerosol delivery device of FIG. 1 in an assembled configuration, wherein the aerosol delivery device further comprises a wrapper according to an example embodiment of the present disclosure;

FIG. 4 illustrates an exploded perspective view of the aerosol delivery device of FIG. 1 according to an example embodiment of the present disclosure;

FIG. 5 illustrates a modified sectional view through the aerosol delivery device of FIG. 1 at the first outer body and the coupler according to an example embodiment of the present disclosure;

FIG. 6 illustrates a sectional view through the coupler of FIG. 1 along line A-A from FIG. 5 according to an example embodiment of the present disclosure;

FIG. 7 illustrates a bottom view of an atomizer, a flow director, a mouthpiece, and the coupler of the aerosol delivery device of FIG. 1 according to an example embodiment of the present disclosure;

FIG. 8 illustrates a side view of the flow director of FIG. 7 according to an example embodiment of the present disclosure;

FIG. 9 illustrates an end view of the flow director and the atomizer of FIG. 7 according to an example embodiment of the present disclosure;

FIG. 10 illustrates an end view of the coupler of the aerosol delivery device of FIG. 1 according to an example embodiment of the present disclosure;

FIG. 11 illustrates a side view of an aerosol delivery device in an assembled configuration, the aerosol delivery device having the general configuration of what can be characterized as an electronic cigarette, and comprising a first outer body, a second outer body, and a coupler positioned therebetween according to a second example embodiment of the present disclosure;

FIG. 12 illustrates a partially exploded side view of the aerosol delivery device of FIG. 11 according to an example embodiment of the present disclosure;

FIG. 13 illustrates a perspective view of an end cap of the aerosol delivery device of FIG. 11 according to an example embodiment of the present disclosure;

FIG. 14 illustrates a perspective view of a mouthpiece of the aerosol delivery device of FIG. 11 according to an example embodiment of the present disclosure;

FIG. 15 illustrates a side view of the aerosol delivery device of FIG. 11 in an assembled configuration, wherein the aerosol delivery device further comprises a wrapper according to an example embodiment of the present disclosure;

FIG. 16 illustrates a longitudinal sectional view through the aerosol delivery device of FIG. 11;

FIG. 17 illustrates a perspective view of a sealing member of the aerosol delivery device of FIG. 11 according to an example embodiment of the present disclosure;

FIG. 18 illustrates a sectional view through the sealing member of FIG. 17;

FIG. 19 illustrates a view of an end of the coupler configured to engage the second outer body of the aerosol delivery device of FIG. 11 according to an example embodiment of the present disclosure;

FIG. 20 illustrates a sectional view through the coupler of the aerosol delivery device of FIG. 11;

FIG. 21 illustrates a view of an end of the coupler configured to engage the first outer body of the aerosol delivery device of FIG. 11 according to an example embodiment of the present disclosure;

FIG. 22 illustrates a side view of a flow director of the aerosol delivery device of FIG. 11 according to an example embodiment of the present disclosure;

FIG. 23 illustrates a perspective view of a mouthpiece connector of the aerosol delivery device of FIG. 11 according to an example embodiment of the present disclosure;

FIG. 24 illustrates a perspective view of a substrate fastener of the aerosol delivery device of FIG. 11 according to an example embodiment of the present disclosure;

FIG. 25 schematically illustrates a method for assembling an aerosol delivery device according to an example embodiment of the present disclosure;

FIG. 26 schematically illustrates a method for assembling an aerosol delivery device according to a second example embodiment of the present disclosure; and FIG. 27 schematically illustrates a controller according to an example embodiment of the present disclosure.

DETAILED DESCRIPTION OF PREFERRED EMBODIMENTS

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural variations unless the context clearly dictates otherwise.

As described hereinafter, embodiments of the present disclosure relate to aerosol delivery devices. Aerosol delivery devices according to the present disclosure may use electrical energy to heat a material (preferably without combusting the material to any significant degree) to form an inhalable substance; such articles most preferably being sufficiently compact to be considered "hand-held" devices. An aerosol delivery device may provide some or all of the sensations (e.g., inhalation and exhalation rituals, types of tastes or flavors, organoleptic effects, physical feel, use rituals, visual cues such as those provided by visible aerosol, and the like) of smoking a cigarette, cigar, or pipe, without any substantial degree of combustion of any component of that article or device. The aerosol delivery device may not produce smoke in the sense of the aerosol resulting from by-products of combustion or pyrolysis of tobacco, but rather, that the article or device most preferably yields vapors (including vapors within aerosols that can be considered to be visible aerosols that might be considered to be described as smoke-like) resulting from volatilization or vaporization of certain components of the article or device. In highly preferred embodiments, aerosol delivery devices may incorporate tobacco and/or components derived from tobacco. As such, the aerosol delivery device can be characterized as an electronic cigarette.

Aerosol delivery devices of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like.

In use, aerosol delivery devices of the present disclosure may be subjected to many of the physical actions employed by an individual in using a traditional type of smoking article (e.g., a cigarette, cigar or pipe that is employed by lighting and inhaling tobacco). For example, the user of an aerosol delivery device of the present disclosure can hold that article much like a traditional type of smoking article, draw on one end of that article for inhalation of aerosol produced by that article, take puffs at selected intervals of time, etc.

The aerosol delivery device most preferably comprises two or more outer bodies or shells. Existing embodiments of aerosol delivery devices including multiple outer bodies or shells are typically configured such that the two or more shells are separable. For example, an aerosol delivery device can possess at one end a control body comprising an outer body or shell containing one or more reusable components (e.g., a rechargeable battery and various electronics for controlling the operation of that article), and at the other end and removably attached thereto an outer body or shell containing a disposable portion (e.g., a disposable flavor-containing cartridge).

However, as described hereinafter, embodiments of the present disclosure relate to aerosol delivery devices comprising multiple shells or outer bodies that may not configured to be separable. In this regard, the aerosol delivery devices of the present disclosure may be disposable in some embodiments. However, in other embodiments the aerosol delivery devices of the present disclosure may be reusable. For example, a power source (e.g., a battery) provided therein may be replaceable or the aerosol delivery device may include a rechargeable battery that may be recharged with any type of recharging technology, including connection to a typical alternating current electrical outlet, connection to a car charger (e.g., cigarette lighter receptacle), and connection to a computer, such as through a universal serial bus (USB) connection or cable. Further, a refilling port or other mechanism may allow for refilling an aerosol precursor composition in some embodiments.

Aerosol delivery devices of the present disclosure most preferably comprise some combination of a power source (i.e., an electrical power source), at least one control component (e.g., means for actuating, controlling, regulating and/or ceasing power for heat generation, such as by controlling electrical current flow from the power source to other components of the aerosol delivery device), a heater or heat generation component (e.g., an electrical resistance heating element or component commonly referred to as an "atomizer"), and an aerosol precursor composition (e.g., commonly a liquid capable of yielding an aerosol upon application of sufficient heat, such as ingredients commonly referred to as "smoke juice," "e-liquid" and "e-juice"), and a mouthend region or tip for allowing draw upon the aerosol delivery device for aerosol inhalation (e.g., a defined air flow path through the article such that aerosol generated can be withdrawn therefrom upon draw). Exemplary formulations for aerosol precursor materials that may be used according to the present disclosure are described in U.S. Pat. Pub. No. 2013/0008457 to Zheng et al. and U.S. Pat. Pub. No. 2013/0213417 to Chong et al., the disclosures of which are incorporated herein by reference in their entirety.

Alignment of the components within the aerosol delivery device of the present disclosure can vary. In specific embodiments, the aerosol precursor composition can be located near an end of the aerosol delivery device which may be configured to be positioned proximal to the mouth of a user so as to maximize aerosol delivery to the user. Other configurations, however, are not excluded. Generally, the heating element can be positioned sufficiently near the aerosol precursor composition so that heat from the heating element can volatilize the aerosol precursor (as well as one or more flavorants, medicaments, or the like that may likewise be provided for delivery to a user) and form an aerosol for delivery to the user. When the heating element heats the aerosol precursor composition, an aerosol is formed, released, or generated in a physical form suitable for inhalation by a consumer. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof.

As noted above, the aerosol delivery device may incorporate a battery or other electrical power source to provide current flow sufficient to provide various functionalities to the aerosol delivery device, such as powering of a heater, powering of control systems, powering of indicators, and the like. The power source can take on various embodiments. Preferably, the power source is able to deliver sufficient power to rapidly heat the heating element to provide for aerosol formation and power the aerosol delivery device through use for a desired duration of time. The power source preferably is sized to fit conveniently within the aerosol delivery device so that the aerosol delivery device can be easily handled. Additionally, a preferred power source is of a sufficiently light weight to not detract from a desirable smoking experience.

More specific formats, configurations and arrangements of components within the aerosol delivery device of the present disclosure will be evident in light of the further disclosure provided hereinafter. Additionally, the selection of various aerosol delivery device components can be appreciated upon consideration of the commercially available electronic aerosol delivery devices, such as those representative products listed in the background art section of the present disclosure. Further, the arrangement of the components within the aerosol delivery device can also be appreciated upon consideration of the commercially available electronic aerosol delivery devices, such as those representative products listed in the background art section of the present disclosure.

One example embodiment of an aerosol delivery device 100 according to the present disclosure is illustrated in FIG. 1. In particular, FIG. 1 illustrates the aerosol delivery device 100 in an assembled configuration. As illustrated, the aerosol delivery device 100 may include a first outer body 102, a second outer body 104, and a coupler 106 positioned between and engaged with the first and second outer bodies. In some embodiments the first outer body 102, the second outer body 104, and/or the coupler 106 may be formed from plastic (e.g., polycarbonate or acrylonitrile butadiene styrene (ABS)), metal (e.g., stainless steel or aluminum), paperboard, cardboard, ceramic, fiberglass, glass (e.g., a resilient glass), or a graphite composite. In some embodiments various attributes of the outer bodies 102, 104 may be similar to those employed in the control body and cartridge of the VUSE® product available from R. J. Reynolds Tobacco Company. Note that while the aerosol delivery device discussed herein is generally described as having two outer bodies and a coupler, additional outer bodies may be employed when respectively connected by an additional coupler.

The coupler 106 may couple the first outer body 102 to the second outer body 104 in an assembled configuration, as illustrated in FIG. 1. In this regard, as illustrated in FIG. 2, the coupler 106 may include a first engagement portion 108, a second engagement portion 110, and a rib 112 positioned therebetween. The first engagement portion 108 of the coupler 106 may be configured to engage an inner end 102A of the first outer body 102 (e.g., by insertion therein). In this regard, one or more gaskets 114 (e.g., one or more suitably sized seals, washers, O-rings, or other gasket means for providing sealing and/or resilience, which may comprise rubber, silicone or other sealant material that is non-reactive with the aerosol forming components) may be positioned in respective grooves 114A (see, FIG. 6) in the first engagement portion 108 of the coupler 106 and configured to engage an inner surface of the first outer body 102. Similarly, the second engagement portion 110 of the coupler 106 may be configured to engage an inner end 104A of the second outer body 104 (e.g., by insertion therein). In this regard, one or more gaskets 116 may be positioned in respective grooves 116A (see, FIG. 6) in the second engagement portion 110 of the coupler and configured to engage an inner surface of the second outer body 104.

Accordingly, in some embodiments a press-fit arrangement may be employed to connect the outer bodies 102, 104 to the coupler 106. However, various other connection mechanisms may be employed to couple the outer bodies to the coupler. For example, threaded engagement, an interference fit, magnetic engagement or other connection mechanisms and arrangements may be employed in other embodiments.

The rib 112 of the coupler 106 may be configured to abut the inner end 102A of the first outer body 102 and the inner end 104A of the second outer body 104. Accordingly, as illustrated in FIG. 1, the rib 112 may separate the first outer body 102 from the second outer body 104. As such, the first outer body 102 and the second outer body 104 may be prevented from making a physical connection (i.e., the first outer body does not directly contact the second outer body). In some embodiments, as illustrated in FIG. 1, the rib 112 may be configured to match an outer profile of the first outer body 102 and the second outer body 104. In this regard, in cylindrical embodiments of the aerosol delivery device 100, the diameter of the rib 112 may be substantially equal to the diameters of the first outer body 102 and the second outer body 104.

The outer bodies 102, 104 may be configured to house and protect a plurality of components received therein, as discussed hereinafter. The outer bodies 102, 104 may thus define any of a plurality of shapes and configurations. However, as described above, in some embodiments it may be preferable to provide the aerosol delivery device with a size, shape, and/or configuration resembling a smoking article such as a cigarette or cigar. Thus, in some embodiments the outer bodies 102, 104 may be generally cylindrical and the aerosol delivery device 100 may define an elongated cylindrical configuration as a result of the coupler 106 engaging the inner ends 102A, 104A of the outer bodies 102, 104. The aerosol delivery device 100 may thus be described as substantially rod-like, substantially tubular shaped, or substantially cylindrically shaped in some embodiments when in the assembled configuration. Accordingly, the typical size, shape and general appearance of the aerosol delivery device 100 may be comparable to commercially available electronic cigarettes.

In some embodiments the outer bodies 102, 104 may define a majority of an outer surface extending along a longitudinal length of the aerosol delivery device 100, which may receive a wrapper thereon, as discussed below. In this regard, in one embodiment the outer bodies may define at least 75%, preferably at least 90%, and most preferably 95% of the outer surface extending along a longitudinal length of the aerosol delivery device, depending on the length of the dimensions of an end cap and a mouthpiece coupled thereto, as discussed below. Further, in some embodiments the first outer body 102 and the second outer body 104 may define substantially the same longitudinal length. However, in other embodiments the outer bodies 102, 104 may define differing longitudinal lengths. For example, a ratio of a longitudinal length of the first outer body 102 to a longitudinal length of the second outer body 104 may be from about 2:1 to about 1:2, from about 3:5 to about 5:3, or from about 4:5 to about 5:4. In this regard, in some embodiments the dimensions of the first outer body 102 may be similar to that of a filter element and the dimensions of the second outer body 104 may be similar to that of a tobacco rod of a traditional cigarette in some embodiments. This configuration may provide adequate room in the second outer body 104 for a power source, which may be included therein as discussed hereinafter.

As illustrated in FIGS. 1 and 2, an end cap 118 may be coupled to the first outer body 102 at an outer end 102B thereof. Further, a mouthpiece 120 may be coupled to an outer end 104B of the second outer body 104. In some embodiments the outer end 102B of the first outer body 102 and/or the outer end 104B of the second outer body 104B may define a chamfer at the inner surface thereof, which may facilitate respective coupling of the end cap 118 and the mouthpiece 120 thereto.

Briefly, the end cap 118 may be configured to cover and substantially prevent access to the outer end 102B of the first outer body 102 and, in some embodiments, provide for output of illumination therethrough. The mouthpiece 120 may be configured to receive a user draw thereon during use to direct aerosol to the user. In some embodiments a sealant or adhesive such as a room temperature vulcanizing (RTV) sealant, a silicone resin, or a polysiloxane, may seal the end cap 118 to the first outer body 102 and/or seal the mouthpiece 120 to the second outer body 104. The mouthpiece 120 may be textured and/or shaped as desired. Example embodiments of mouthpieces that may be employed in the aerosol delivery device of the present disclosure are provided in U.S. Pat. Pub. No. 2013/0276802 to Scatterday.

As illustrated in FIG. 3, in some embodiments a wrapper 122 (e.g., a label or an overwrap) may at least partially surround the outer bodies 102, 104. For example, the wrapper 122 may include an overlapping or abutting seam. In one embodiment the wrapper 122 may comprise a single layer of a material (e.g., plastic, paper, or foil). Alternatively, the wrapper 122 may comprise a multi-layer lamination (e.g., a lamination of plastic, paper, and/or foil). The wrapper 122 may include indicia on an outer surface thereof. For example, the indicia may include information such as a product identifier, which may be formed by ink applied to one or more of the layers of the wrapper 122. The indicia on the wrapper 122 likewise may include texturing, coloring, and/or other physical attributes that may provide a desired appearance to the device, such as resembling a conventional cigarette or a conventional electronic cigarette. Example embodiments of wrappers which may be employed in the aerosol delivery device of the present disclosure are provided in U.S. Pat. Pub. No. 2013/0284190 to Scatterday et al., which is incorporated herein by reference in its entirety.

The wrapper 122 may include an adhesive at an inner surface thereof or adhesive may otherwise be positioned between the wrapper and the outer bodies 102, 104. Thus, the wrapper 122 may be secured to an outer surface of the outer bodies 102, 104. In this regard, embodiments of the present disclosure may include at least one securing mechanism configured to substantially irreversibly secure the first outer body 102 to the second outer body 104. In some embodiments the securing mechanism may comprise the above-described wrapper 122. Thus, when adhered to the first outer body 102 and the second outer body 104, the wrapper 122 may act as a structural member that assists in retaining the coupling between the outer bodies via the coupler 106. For example, in the illustrated embodiment, the wrapper 122 extends from the outer end 102B of the first outer body 102 to the outer end 104B of the second outer body 104, such that coupling between the wrapper and the first and second outer bodies retains the aerosol delivery device 100 in the assembled configuration. Additionally, in embodiments in which the coupler 106 includes the rib 112, contact between the wrapper 122 and the rib may further assist in maintaining the aerosol delivery device in the assembled configuration. Further, in some embodiments the wrapper 122 may extend at least partially over the end cap 118 to secure the end cap to the first outer body 102 and/or extend at least partially over the mouthpiece 120 to secure the mouthpiece to the second outer body 104.

Although the securing mechanism is described above as comprising the wrapper 122, various other embodiments of securing mechanisms configured to substantially irreversibly secure the first outer body 102 to the second outer body 104 may be employed. Thus, for example, the securing mechanism may comprise sealant applied between the coupler 106 and one or both of the outer bodies 102, 104. By way of further example, the securing mechanism may comprise single-use connectors at the coupler 106 configured to engage the outer bodies 102, 104. In another embodiment the securing mechanism may comprise other connection mechanisms (e.g., welds, crimps, or solder), that cause portions of the outer bodies 102, 104 to engage the coupler 106. Note that substantially irreversibly secured, as used herein, refers to a configuration in which the outer bodies 102, 104 may not be separated from one another without damaging the securing mechanism and/or without preventing recoupling of the referenced components. Thus, for example, the wrapper 122 may be torn or otherwise damaged if the outer bodies 102, 104 of the aerosol delivery device 100 were to be separated.

FIG. 4 illustrates an exploded view of the aerosol delivery device 100. As illustrated, the aerosol delivery device 100 may include a plurality of additional components as described in greater detail hereinafter. In this regard, the aerosol delivery device 100 may additionally include a mouthpiece shipping plug 124 which may be configured to engage and protect the mouthpiece 120 prior to use of the aerosol delivery device. For example, the mouthpiece shipping plug 120 may prevent the entry of contaminants into the mouthpiece 120. Thus, the mouthpiece shipping plug 120 may be removed prior to use of the aerosol delivery device 100.

Further, a plurality of components may be positioned in one or both of the first outer body 102 and the second outer body 104. In this regard, a reservoir substrate 126, an atomizer 128, and a flow director 130 (e.g., a flow tube or other structure defining an airflow passage) may be positioned in the second outer body 104. The atomizer 128 may include a liquid transport element 132 with a heating element 134 coupled thereto.

Further, a power source 136 (e.g., a battery such as a lithium polymer battery) and an electrical circuit 138 may be positioned in the first outer body 102. Examples of power sources are described in U.S. Pat. App. Pub. No. 2010/0028766 by Peckerar et al., the disclosure of which is incorporated herein by reference in its entirety. The electrical circuit 138 may include a control module 140, a spacer 142, and/or a safety switch 144 in some embodiments. One or more electrical connectors 146 (e.g., electrical wires) may be configured to electrically connect the atomizer 128 to the power source 136. In this regard, the electrical connectors 146 may extend between the first outer body 102 and the second outer body 104 through the coupler 106 in the assembled configuration. In one embodiment one or more electrical couplers 148 (e.g., brass couplers, solder, crimped couplers, or wound wires) may be employed to couple the electrical connectors 146 to the heating element 134. Thus, in some embodiments the electrical couplers 148 may be received in the second outer body 104.

In terms of operation of the aerosol delivery device 100, a user may draw on the mouthpiece 120. Accordingly, air may enter the aerosol delivery device 100 through an inlet aperture. For example, in the illustrated embodiment, an inlet aperture 150 (see, e.g., FIG. 1) is defined in the first outer body 102. However, in other embodiments the inlet aperture may be defined in the second outer body. Note that in embodiments of the aerosol delivery device 100 including the wrapper 122, a cutout 152 (see, FIG. 3) may align with the inlet aperture 150 such that the inlet aperture is not blocked. Alternatively, the wrapper may be substantially air-permeable, particularly in the area adjacent the inlet aperture, so as to allow sufficient air passage therethrough and into the inlet aperture.

Air entering through the inlet aperture 150 in the first outer body 102 may be directed through the coupler 106 to the second outer body 104. In this regard, as illustrated in FIG. 5, the inlet aperture 150 may align with a recessed portion 154 defined at a peripheral surface 155 of the first engagement portion 108 of the coupler 106. Note that alignment of the recessed portion 154 of the coupler 106 may only require longitudinal alignment of the inlet aperture 150 with the recessed portion, along the longitudinal length of the aerosol delivery device 100. In this regard, in some embodiments the recessed portion 154 may extend around the peripheral surface 155 of the coupler 106 (e.g., around the entirety of the circumference thereof). Further, as illustrated, in some embodiments the inlet aperture 150 and the recessed portion 154 may be configured to align when the inner end 102A of the first outer body 102 abuts the rib 112. Accordingly, alignment of the inlet aperture 150 with the recessed portion 154 may be substantially easily achieved during assembly. Air received in the recessed portion 154 of the coupler 106 may be directed through one or more coupler inlet(s) 156 defined in the coupler 106 at the recessed portion.

FIG. 6 illustrates a cross-sectional view through the coupler 106 along line A-A in FIG. 5. As illustrated in FIG. 6, the coupler inlet 156 may connect to a longitudinal channel 158 extending along at least a portion of the longitudinal length of the coupler 106. Further, a pressure port 160 may additionally be in communication with the coupler inlet 156 and/or the longitudinal channel 158. The pressure port 160 may extend to a pressure port opening 162 positioned inside the first outer body 102 when the coupler 106 is connected thereto.

Accordingly, the control module 140 (see, FIG. 4) may detect when a user draws on the mouthpiece 120. In this regard, the control module 140 may comprise a sensor configured to detect a puff. For example, a pressure sensor may be used to detect a pressure drop accompanying a draw on the mouthpiece 120. Representative current regulating components and other current controlling components including various microcontrollers for aerosol delivery devices are described in U.S. Pat. No. 4,735,217 to Gerth et al., U.S. Pat. Nos. 4,922,901, 4,947,874, and 4,947,875, all to Brooks et al., U.S. Pat. No. 5,372,148 to McCafferty et al., U.S. Pat. No. 6,040,560 to Fleischhauer et al., U.S. Pat. No. 7,040,314 to Nguyen et al., and U.S. Pat. No. 8,205,622 to Pan, all of which are incorporated herein by reference in their entireties. Reference also is made to the control schemes described in U.S. application Ser. No. 13/837,542 to Ampolini et al., filed Mar. 15, 2013, which is incorporated herein by reference in its entirety. In some embodiments, a pressure sensor and a microcontroller may be combined in control module 140.

Thus, as a result of the control module 140 being positioned in the first outer body 102, a drop in pressure may be detected when a user draws on the aerosol delivery device 100. In this regard, the first outer body 102 may be substantially sealed as a result of the end cap 118 being positioned at the outer end 102B and the gaskets 114 being positioned at the inner end 102A of the outer body (see, e.g., FIG. 4). Thereby, the pressure drop associated with the puff on the aerosol delivery device 100 may be detected, but airflow through the first outer body 102 may be substantially avoided, since the first outer body is substantially sealed other than at the pressure port 160.

Airflow in the above described manner is designed to avoid airflow past the power source 136. Further, note that a size of the pressure port opening 162 (e.g., a diameter thereof) may be smaller than a diameter of a coupler outlet opening 164 (see, FIG. 6) in communication with the second outer body 104. Accordingly, a Venturi effect may be created during a draw on the aerosol delivery device 100, which further assists in preventing airflow through the first outer body 102 while still allowing detection of a pressure drop therein.

Thus, as noted above, the control module 140 may sense a puff on the aerosol delivery device 100. When the puff is sensed, control module 140 may direct current from the power source 136 through the electrical connectors 146 to the heating element 134. Thus, as described in greater detail below, the heating element 134 may vaporize an aerosol precursor composition directed from the reservoir substrate 126 to the heating element via the liquid transport element 132. Accordingly, the heating element 134 may vaporize the aerosol precursor composition directed to an aerosolization zone from the reservoir substrate 126 by the liquid transport element 132 and air and the entrained vapor (e.g., the components of the aerosol precursor composition in an inhalable form) may be directed to a user drawing thereon.

The safety switch 144 may be configured to control or stop the flow of current to the heating element 134 under certain circumstances. For example, the safety switch may be configured to stop the flow of current to the heating element 134 after a predetermined length of time, regardless of whether a detected puff continues, in order to prevent the heating element 134 from overheating. Accordingly, issues with respect to the aerosol delivery device 100 overheating may be avoided.

In some embodiments the control module 140 may perform additional functions. For example, the control module 140 may also include an optional indicator (e.g., a light emitting diode (LED)). The indicator may illuminate, for example, during a user drawing on the aerosol delivery device, as detected by the control module 140. The end cap 118 may be adapted to make visible the illumination provided thereunder by the indicator. In this regard, the end cap 118 may be transparent or translucent. Accordingly, the indicator may illuminate during use of the aerosol delivery device 100 to simulate the lit end of a smoking article. However, in other embodiments the indicator can be provided in varying numbers and can take on different shapes and can even be an opening in the outer body (such as for release of sound when such indicators are present).

As noted above, air received through the inlet aperture 150 in the first outer body 102 may be directed through the recessed portion 154, the coupler inlet 156, and the longitudinal channel 158 extending along at least a portion of the longitudinal length of the coupler 106. Thereby, the air may be directed to the flow director 130. The flow director 130 may define a tubular configuration or other structure in which an air passageway is defined therethrough. In this regard, as illustrated in FIGS. 5 and 6, the coupler 106 may define a nipple 166.

Further, as illustrated in FIG. 7, the nipple 166 may couple to the flow director 130. For example, the flow director 130 may extend over the nipple 166 to provide for engagement therebetween. In this regard, the flow director 130 may comprise a flexible, resilient material such as fiberglass which may deform (e.g., stretch) slightly to allow for receipt of the nipple 166 therein and fit snuggly over the nipple and form a seal therewith. Accordingly, air received from the coupler 106 may be directed through a longitudinal aperture 168 defined through the flow director 130.

Thus, drawn air through the device is directed past the heating element 134. More particularly, as illustrated in FIG. 8, the flow director 130 may define a transverse aperture 170 extending therethrough. As illustrated, the transverse aperture 170 may extend substantially perpendicularly to the longitudinal aperture 168. As illustrated in FIG. 7, the atomizer 128 may extend through the transverse aperture 170. Thereby, the heating element 134 may be positioned in the longitudinal aperture 168 extending along the length of the flow director 130. More particularly, the heating element 134 may extend transversely relative to the longitudinal aperture 168 such that at least a portion of the heating element is positioned in the longitudinal aperture.

In some embodiments, in order to facilitate insertion of the atomizer 128 in the transverse aperture 170, a slit 172 may be defined in the flow director 130. The slit 172 may extend from an outer surface of the flow director 130 to the transverse aperture 170. For example, as illustrated in FIG. 7, the slit 172 may define a V-shape. Thereby, during assembly, the flow director 130 may be folded at the slit 172 to facilitate insertion of the atomizer 128 into the transverse aperture 170, rather than inserted lengthwise through the transverse aperture 170. For example, the heating element 134 may catch on the flow director 130 during lengthwise insertion of the atomizer 128 when longitudinal insertion is employed. Thus, use of the slit 172 may expedite assembly of the aerosol delivery device 100 by allowing for coupling of the atomizer 128 to the flow director 130 without requiring lengthwise insertion of the atomizer 128 through the transverse aperture 170.

Following insertion of the atomizer 128 into the transverse aperture 170, the flow director 130 may be folded back into the original longitudinal (e.g., tubular) configuration. Accordingly, as illustrated in FIG. 9, the heating element 134 may be at least partially positioned within the longitudinal aperture 168 extending through the flow director 130. Thus, drawn air received from the coupler 106 during a user puff may be directed by the flow director 130 past the heating element 134 before being directed by the longitudinal aperture 168 to the mouthpiece 120, as illustrated in FIG. 7. In this regard, the mouthpiece 120 may define a nipple 174. Thus, the flow director 130 may extend over the nipple 174 to provide for engagement therebetween. As noted above, the flow director 130 may comprise a flexible, resilient material such as fiberglass which may deform (e.g., stretch) slightly to allow for receipt of the nipple 174 therein. Accordingly, air traveling through the longitudinal aperture 168 defined through the flow director 130 may be directed through the mouthpiece 120 and to a user's mouth.

As illustrated in FIG. 9, the flow director 130 may extend at least partially through the reservoir substrate 126 so as to define an air passageway therethrough. Further, as illustrated in FIGS. 8 and 9, the liquid transport element 132 may define a center portion 176 and first and second opposing arms 178A, 178B extending therefrom. The heating element 134 may be coupled to the center portion 176 of the liquid transport element 132.

The opposing arms 178A, 178B of the liquid transport element 132 may be configured to direct an aerosol precursor composition to the heating element 134. In this regard, the reservoir substrate 126 may be configured to hold (e.g., support, carry, and/or store) an aerosol precursor composition therein. The aerosol precursor composition, also referred to as a vapor precursor composition, may comprise a variety of components including, by way of example, a polyhydric alcohol (e.g., glycerin, propylene glycol, or a mixture thereof), nicotine, tobacco, tobacco extract, and/or flavorants. Various components that may be included in the aerosol precursor composition are described in U.S. Pat. No. 7,726,320 to Robinson et al., which is incorporated herein by reference in its entirety. Additional representative types of aerosol precursor compositions are set forth in U.S. Pat. No. 4,793,365 to Sensabaugh, Jr. et al.; U.S. Pat. No. 5,101,839 to Jakob et al.; PCT WO 98/57556 to Biggs et al.; and Chemical and Biological Studies on New Cigarette Prototypes that Heat Instead of Burn Tobacco, R. J. Reynolds Tobacco Company Monograph (1988); the disclosures of which are incorporated herein by reference in their entireties. Other aerosol precursors which may be employed in the aerosol delivery device 100 include the aerosol precursors included in the VUSE® product by R. J. Reynolds Vapor Company, the BLU™ product by Lorillard Technologies, the Mistic Menthol product by Mistic Ecigs, and the Vype product by CN Creative Ltd. Also desirable are the so-called "Smoke Juices" for electronic cigarettes that have been available from Johnson Creek Enterprises LLC.

The reservoir substrate 126 may comprise one layer or a plurality of layers of woven or nonwoven fibers (e.g., C-glass, E-glass, polyethylene terephthalate (PET)) formed into the shape of a tube encircling the interior of the second outer body 104. Thus, liquid components, for example, can be sorptively retained by the reservoir substrate 126. The reservoir substrate 126 is in fluid connection with the liquid transport element 132. In this regard, the opposing arms 178A, 178B may be positioned between the flow director 130 and the reservoir substrate 126. Accordingly, contact between the liquid transport element 132 and the reservoir substrate 126 may allow for fluid transfer therebetween. Thus, the liquid transport element 132 may be configured to transport liquid from the reservoir substrate 126 to the heating element 134 (e.g., via wicking or capillary action). In FIG. 9, a space is present between the reservoir substrate 126 and the flow director 130 for accommodating the opposing arms 178A, 178B. In other embodiments, the reservoir substrate 126 may be in substantial contact with the flow director 130 around at least a portion of the circumference of the flow director. As such, at least a portion of the opposing arms 178A, 178B may be substantially flattened between the reservoir substrate and the flow director. Exemplary reservoirs formed of cellulose acetate fibers and liquid transport elements that may be used herein as described in U.S. patent application Ser. No. 13/802,950 to Chapman et al., filed Mar. 14, 2013, which is incorporated herein by reference in its entirety.

As illustrated in FIG. 9, the liquid transport element 132 may be in direct contact with the heating element 134. As further illustrated in FIG. 9, the heating element 134 may comprise a wire defining a plurality of coils (e.g., from about 4 coils to about 12 coils) wound about the liquid transport element 132. In some embodiments the heating element 134 may be formed by winding the wire about the liquid transport element 132 as described in U.S. Pat. Pub. No. 2014/0157583 to Ward et al., which is incorporated herein by reference in its entirety. Further, in some embodiments the wire may define a variable coil spacing, as described in U.S. patent application Ser. No. 13/827,994 to DePiano et al., filed Mar. 14, 2013, which is incorporated herein by reference in its entirety. Various embodiments of materials configured to produce heat when electrical current is applied therethrough may be employed to form the heating element 134. Example materials from which the wire coil may be formed include Kanthal (FeCrAl), Nichrome, Molybdenum disilicide ($MoSi_2$), molybdenum silicide (MoSi), Molybdenum disilicide doped with Aluminum ($Mo(Si,Al)_2$), graphite and graphite-based materials; and ceramic (e.g., a positive or negative temperature coefficient ceramic).

However, various other embodiments of methods may be employed to form the heating element 134, and various other embodiments of heating elements may be employed in the atomizer 128. For example, a stamped heating element may be employed in the atomizer, as described in U.S. patent application Ser. No. 13/842,125 to DePiano et al., filed Mar. 15, 2013, which is incorporated herein by reference in its entirety. Further to the above, additional representative heating elements and materials for use therein are described in U.S. Pat. No. 5,060,671 to Counts et al.; U.S. Pat. No. 5,093,894 to Deevi et al.; U.S. Pat. No. 5,224,498 to Deevi et al.; U.S. Pat. No. 5,228,460 to Sprinkel Jr., et al.; U.S. Pat. No. 5,322,075 to Deevi et al.; U.S. Pat. No. 5,353,813 to Deevi et al.; U.S. Pat. No. 5,468,936 to Deevi et al.; U.S. Pat. No. 5,498,850 to Das; U.S. Pat. No. 5,659,656 to Das; U.S. Pat. No. 5,498,855 to Deevi et al.; U.S. Pat. No. 5,530,225 to Hajaligol; U.S. Pat. No. 5,665,262 to Hajaligol; U.S. Pat. No. 5,573,692 to Das et al.; and U.S. Pat. No. 5,591,368 to Fleischhauer et al., and U.S. Pat. Pub. No. 2013/0192618 to Li et al., the disclosures of which are incorporated herein by reference in their entireties. Further, chemical heating may be employed in other embodiments. Various additional examples of heaters and materials employed to form heaters are described in U.S. Pat. Pub. No. 2014/0060554 to Collett et al., which is incorporated herein by reference, as noted above. Additionally, in various embodiments, one or more microheaters or like solid state heaters may be used.

Note that, as illustrated in FIG. 7, the heating element 134 may be positioned relatively closer to the coupler 106 than the mouthpiece 120. This configuration may be preferable in that it provides a separation between a user's mouth and the heating element 134, which produces heat during use. Accordingly, as a result of the heating element 134 being positioned proximate the coupler 106, the opposing arms 178A, 178B may be folded away from the coupler 106 in order for the liquid transport element 132 to remain in contact with a significant portion of the reservoir substrate 126. This configuration may also result in the one or more electrical connectors 146 extending in an opposite direction as compared to the opposing arms 178A, 178B of the liquid transport element 132, toward the coupler 106, with the electrical couplers 148 connecting the heating element 134 to the electrical connectors 146.

In this regard, FIG. 10 illustrates a view of the coupler 106 at an end configured to engage the first outer body 102. As illustrated, one or more connector apertures 180 may extend through a longitudinal length of the coupler 106. Accordingly, the electrical connectors 146 may extend from the first outer body 102 through the connector apertures 180 to the second outer body 104 in order to connect the atomizer 128 to the power source 136.

As noted above, various embodiments of connection mechanisms may be employed to couple first and second outer bodies to a coupler. For example, in an embodiment described above, gaskets are received in grooves in the coupler. These gaskets engage inner surfaces of the first outer body and the second outer body so as to provide for secure engagement therebetween, which may be enhanced through usage of an external wrapper or various other securing mechanism(s) described above to substantially irreversibly secure the first outer body and the second outer body to the coupler.

However, embodiments of an aerosol delivery device may employ various additional and alternative securing mechanisms for substantially irreversibly securing a first outer body and a second outer body to a coupler, as described hereinafter. The aerosol delivery device may be substantially similar to the aerosol delivery device described above in a number of respects. Accordingly, where similarities exist, the description with respect to certain features and aspects thereof may not be repeated for brevity purposes. Thus, it should be understood that the description provided elsewhere herein may be equally applicable to the aerosol delivery device described hereinafter, except where otherwise noted. Further, it should be understood that the embodiments of aerosol delivery devices described herein may be combined in any manner, such that the particularly-described configurations are provided for example purposes only.

FIG. 11 illustrates an aerosol delivery device 200 according to an additional example embodiment of the present disclosure. In particular, FIG. 11 illustrates the aerosol delivery device 200 in an assembled configuration. As illustrated, the aerosol delivery device 200 may include a first outer body 202, a second outer body 204, and a coupler 206 positioned between and engaged with the first outer body and the second outer body. Thus, the coupler 206 may couple the first outer body 202 to the second outer body 204 in an assembled configuration.

In this regard, as illustrated in FIG. 12, the coupler 206 may include a first engagement portion 208, a second engagement portion 210, and a rib 212 positioned therebetween. The first engagement portion 208 of the coupler 206 may be configured to engage an inner end 202A of the first outer body 202 (e.g., by insertion therein). Similarly, the second engagement portion 210 of the coupler 206 may be configured to engage an inner end 204A of the second outer body 204 (e.g., by insertion therein). As illustrated in FIG. 11, the rib 212 may contact the inner end 202A of the first outer body 202 and the inner end 204A of the second outer body 204 and separate the first outer body from the second outer body. As such, the first outer body 202 and the second outer body 204 may be prevented from making a physical connection (i.e., the first outer body does not directly contact the second outer body).

In order to substantially irreversibly secure the first outer body 202 and/or the second outer body 204 to the coupler 206, in some embodiments the coupler may be welded to one or both of the first outer body and the second outer body. Note that while the discussion provided below generally references welding the coupler to both the first outer body and the second outer body, in other embodiments only the first outer body or the second outer body may be welded to the coupler, and an alternative securing mechanism may be employed to secure the other outer body to the coupler. For example, in one embodiment the coupler may be welded on one of the first outer body and the second outer body and glued to the other of the first outer body and the second outer body.

In one embodiment the coupler 206 may be laser welded to the first outer body 202 and the second outer body 204. In this regard, in some embodiments the first outer body 202 and the second outer body 204 may be formed from a substantially transparent material (e.g., a substantially clear plastic material such as polycarbonate). Accordingly, laser beams directed at the first outer body 202 (e.g., proximate the inner end 202A) and the second outer body 204 (e.g., proximate the inner end 204A) may travel therethrough to the coupler 206. In particular, a laser beam may be directed through the first outer body 202 so as to be incident upon the first engagement portion 208 of the coupler 206 when welding the first outer body to the coupler. Similarly, a laser beam may be directed through the second outer body 204 so as to be incident upon the second engagement portion 210 of the coupler 206 when welding the second outer body to the coupler.

Thus, for example, the coupler 206 may absorb energy from the laser beams. In this regard, the coupler 206 may be configured to melt when a laser beam is incident thereon and bond with adjacent portions of the first outer body 202 and the second outer body 204. In order to improve energy absorption, in some embodiments the coupler 206 may define a relatively dark color such as black, and may be formed from a material (e.g., a plastic such as polycarbonate) configured to bond to the first outer body 202 and the second outer body 204 when melted. The peripheral surface of at least a portion of the first engagement portion 208 and the second engagement portion 210 of the coupler 206 may be configured to substantially match a size and shape of the inner surface of the first outer body 202 at the inner end 202A and the second outer body 204 at the inner end 204A, respectively. Thereby, the outer surface of the coupler 206 may melt in contact with the inner surface of the first outer body 202 and the second outer body 204 in order to cause bonding therebetween.

Although laser welding is discussed above, various other methods and types of welding may be employed in other embodiments. For example, arc welding, gas welding, resistance welding, energy beam welding, and solid-state welding may be employed in various embodiments. An example of a solid-state welding process is ultrasonic welding which uses ultrasonic vibrations to create a weld between two workpieces held together under pressure. Another example of a solid-state welding process is induction welding, which uses electromagnetic induction to heat workpieces. However, the type of welding employed to couple the coupler 206 to the first outer body 202 and/or the second outer body 204 may depend on the particular materials from which the coupler and the first outer body and the second outer body are formed. Thus, for example, in embodiments in which the coupler 206 and the first outer body 202 and the second outer body 204 are formed from plastic or other non-ferromagnetic materials, the materials may be implanted with metallic or ferromagnetic compounds, called susceptors in order to allow for induction welding thereof. As may be understood, these welding methods may provide a hermetic seal, which may be beneficial in terms of preventing leakage of fluids between the first outer body 202 and the second outer body 204, as discussed below.

As illustrated in FIGS. 11 and 12, an end cap 218 may be coupled to the first outer body 202 at an outer end 202B thereof. The end cap 218 may be configured to cover and substantially prevent access to the outer end 202B of the first outer body 204 and, in some embodiments, provide for output of illumination therethrough. Thus, the end cap 218 may be translucent, transparent, or define apertures therethrough.

In some embodiments a sealant, a glue, or an adhesive such as a room temperature vulcanizing (RTV) sealant, a silicone resin, or polysiloxane, may seal the end cap 218 to the first outer body 202. In this regard, FIG. 13 illustrates an enlarged perspective view of the end cap 218. As illustrated, the end cap 218 may define an end portion 284 configured to abut the outer end 202B of the first outer body 202 (see, e.g., FIG. 11) and a recessed sidewall 286 configured to be received inside the first outer body. Sealant, glue, or adhesive may be applied to the recessed sidewall 286 and/or the inner surface of the first outer body 202 proximate the outer end 202B in order to bond the end cap with the first outer body. Further, the recessed sidewall 286 may define a cutout 288. The cutout 288 may be configured to receive a sealant, an adhesive, or a glue in order to further secure the end cap 218 to the first outer body 202 and/or retain one or more components in the first outer body in a desired position, as described below.

Further, as illustrated in FIGS. 11 and 12, a mouthpiece 220 may be coupled to an outer end 204B of the second outer body 204. The mouthpiece 220 may be configured to receive a user draw thereon during use to direct aerosol to the user as described in detail below. FIG. 14 illustrates an enlarged perspective view of the mouthpiece 220. As illustrated, the mouthpiece 220 may define an end portion 290 and a recessed sidewall 292. The end portion 290 may be configured to abut the outer end 204B of the second outer body 204 (see, e.g., FIG. 11). The recessed sidewall 292 may include a plurality of peripheral ribs 294 configured to engage an inner surface of the second outer body 204. In this regard, in one embodiment the mouthpiece 220 may be formed from an elastomeric material such as silicone, such that the peripheral ribs 294 compress during insertion into the second outer body 204 to firmly hold the mouthpiece in engagement with the inner surface of the second outer body. However, in other embodiments the mouthpiece may be additionally or alternatively coupled to the second outer body in a variety of manners including through usage of a sealant, an adhesive, or a glue.

Further, the end cap 218 and/or the mouthpiece 220 may be respectively coupled to the first outer body 202 and the second outer body 204 in differing manners in other embodiments. For example, in some embodiments the end cap 218 may be laser welded to the first outer body 202 and/or the mouthpiece 220 may be laser welded to the second outer body 204. In this regard, the end cap 218 may be configured to melt when a laser beam is incident thereon and bond with adjacent portions of the first outer body 202 and the mouthpiece 220 may be configured to melt when a laser beam is incident thereon and bond with adjacent portions of the second outer body 204. In order to improve energy absorption, in some embodiments the end cap 218 and/or the mouthpiece 220 may define a relatively dark color such as black, and may be formed from a material (e.g., a plastic such as polycarbonate) configured to respectively bond to the first outer body 202 and the second outer body 204 when melted. Further, as noted above, the first outer body 202 and/or the second outer body 204 may be substantially transparent so as to allow a laser beam to be directed therethrough. The peripheral surface of end cap 218 may be configured to substantially match a size and shape of the inner surface of the first outer body 202 at the outer end 202B and the peripheral surface of the mouthpiece 220 may be configured to substantially match a size and shape of the inner surface of the second outer body 204 at the outer end 204B. Thereby, the outer surface of the end cap 218 may melt in contact with the inner surface of the first outer body 202 and outer surface of the mouthpiece 220 may melt in contact with the inner surface of the second outer body 204 in order to cause bonding therebetween.

As illustrated in FIG. 15, in some embodiments the aerosol delivery device 200 may include a wrapper 222 (e.g., a label or an overwrap) extending around an outer periphery thereof. For example, the wrapper 222 may include an overlapping or abutting seam. Thus, the wrapper 222 may at least partially surround the first outer body 202 and the second outer body 204 (see, e.g., FIG. 11). In some embodiments the wrapper 222 may be coupled to the first outer body 202 and the second outer body 204 via an adhesive, which may further assist in retaining the first outer body, the second outer body, and the coupler 206 (see, e.g., FIG. 11), and optionally the end cap 218 and the mouthpiece 220 (e.g., in embodiments in which the wrapper contacts the end cap and the mouthpiece), in the assembled configuration. The wrapper 222 may be formed from one or more of various materials including, for example, plastic, paper, or foil. As noted above, in some embodiments the first outer body 202 and the second outer body 204 may be transparent. Accordingly, in order to provide the aerosol delivery device 200 with an integral appearance, the wrapper 222 may comprise aluminum foil paper and/or other substantially opaque and/or reflective materials.

FIG. 16 illustrates a longitudinal cross-sectional view through the aerosol delivery device 200. As illustrated, the aerosol delivery device 200 may include a plurality of additional components as described in greater detail hereinafter. The additional components may be received in one or both of the first outer body 202 and the second outer body 204 in any of various manners. However, in one embodiment a reservoir substrate 226, an atomizer 228, and a flow director 230 (e.g., a flow tube or other structure defining an airflow passage) may be positioned in the second outer body 204. The atomizer 228 may include a liquid transport element 232 with a heating element 234 coupled thereto.

Further, in one example embodiment, a power source 236 and an electrical circuit 238 may be positioned in the first outer body 202. As illustrated, the electrical circuit 238 may include a control module 240 and a protection circuit module (PCM) 244. The protection circuit module 244 may be configured to prevent short-circuiting and/or control power output from the power source 236 such that the heating element 234 receives a substantially consistent amount of power in response to each draw on the aerosol delivery device 200, despite the changes in the remaining capacity of the power source.

Further, the control module 240 may include a puff sensor, a controller, and/or an indicator. The puff sensor (e.g., a pressure sensor or a flow sensor) may be configured to detect a puff on the aerosol delivery device 200, as discussed below. The controller may be configured to direct current from the power source 236 to the atomizer 228, for example in response to a signal from the puff sensor. Further the indicator (e.g., a light emitting diode) may be configured to emit light (e.g., through the end cap 218), under certain circumstances such as during heating of the atomizer 228. In this regard, as illustrated, in some embodiments the control module 240 may be at least partially received within the end cap 218. Thus, for example, glue 296 may be received in the cutout 288 in the end cap 218 so as to retain the control module 240 in the end cap. Accordingly, the control module 240 may detect when a user draws on the mouthpiece 220 and control certain operations in response thereto such as emission of light through the end cap 218 and heating of the heating element 234.

As noted above, the control module 240 may be configured to direct power to the atomizer 228. In particular, power may be directed from the power source 236 to the atomizer 228 by the control module 240 via one or more electrical connectors 246 (see, e.g., FIG. 12), which may comprise electrical wires, and which may be soldered, crimped, wound, or otherwise connected to the heating element 234. The electrical connectors 246 may extend between the first outer body 202 and the second outer body 204 through the coupler 206 in the assembled configuration.

In this regard, one or more connector apertures 280 may extend through a longitudinal length of the coupler 206. Accordingly, the electrical connectors 246 may extend from the first outer body 202 through the connector apertures 280 to the second outer body 204 in order to connect the atomizer 228 to the power source 236. However, the connector apertures 280 may potentially allow for leakage of a fluid therethrough. In this regard, the electrical connectors 246 may extend near, or in contact with, the reservoir substrate 226, which may be saturated with an aerosol precursor composition. Thereby, the potential for the electrical connectors 246 to direct fluid such as the aerosol precursor composition from the reservoir substrate 226 through the connector apertures 280 and to the first outer body 202 may exist.

In order to resist such leakage, in some embodiments the aerosol delivery device 200 may further comprise a sealing member 298 sealed against the coupler 206 and the one or more electrical connectors 246 extending therethrough. In this regard, the coupler 206 may define a recess 300 configured to receive the sealing member 298 therein. As illustrated in FIG. 17, the sealing member 298 may define an annular shape and may include one or more inner ribs 302 and one or more outer ribs 304. The inner ribs 302 and the outer ribs 304 may be respectively configured to seal against inner and outer surfaces of the recess 300 such that leakage around the sealing member 298 is resisted at inner and outer surfaces thereof.

As illustrated in FIG. 16, in one embodiment the recess 300 may be defined at an end of the coupler 206 configured to engage the second outer body 204. Accordingly, the sealing member 298 may be positioned in proximity to the reservoir substrate 226 when the aerosol delivery device 200 is assembled. This configuration may allow for sealing of the reservoir substrate 226, which may hold a liquid aerosol precursor composition, in a compartment defined within the second outer body 204 between the coupler 206 and the mouthpiece 220. Thereby, for example, the aerosol delivery device 200 may be assembled in stages with the first outer body 202 being assembled to the coupler 206 after the second outer body 204 is assembled to the coupler. However, in other embodiments the sealing member may be engaged with an opposing side of the coupler proximate the first outer body, while still sealing against the coupler and the electrical connectors.

As illustrated in FIG. 16, in some embodiments the sealing member 298 may define one or more connector receivers 306 respectively configured to align with the connector apertures 280. The connector receivers 306 may be configured to receive the connectors 246 therethrough. However, as illustrated in FIG. 18, the connector receivers 306 may not extend entirely through the sealing member 298. In this regard, the sealing member 298 may further define a penetrable portion 308 respectively positioned at an end of each of the connector receivers 306. Each of the penetrable portions 308 may be configured to be pierced by the connectors 246 during assembly of the aerosol delivery device 200. For example, as noted above, the connectors 246 may comprise wires, which may pierce through the penetrable portions 308 such that the sealing member 298 tightly seals thereagainst. For example, the sealing member 298 may comprise silicone or other material configured to be penetrable and to seal against the connectors 246 and the coupler 206 in the manner described herein.

The aerosol delivery device 200 may additionally include one or more features configured to facilitate alignment of the connector receivers 306 in the sealing member 298 with the connector apertures 280 extending through the connector 206. For example, as illustrated in FIG. 17, in one embodiment the sealing member 298 may further comprise an alignment aperture 310. Further, as illustrated in FIG. 19, the coupler 206 may define an alignment pin 312. The sealing member 298 and the coupler 206 may be configured such that when the alignment pin 312 engages the alignment aperture 310, the connector apertures 280 are aligned with the connector receivers 306. However, in another embodiment the sealing member may define an alignment pin configured to engage an alignment aperture in the coupler.

Air flow through the aerosol delivery device 200 associated with operation thereof is discussed below, with reference generally to FIG. 16, except where otherwise noted. During use, a user may draw on the mouthpiece 220. Accordingly, air may enter the aerosol delivery device 200 through one or more inlet apertures. For example, in the illustrated embodiment, inlet apertures 250 are defined in the first outer body 202. However, in other embodiments the inlet apertures may be defined in the second outer body. In embodiments of the aerosol delivery device 200 including the wrapper 222, one or more cutouts 252 (see, e.g., FIG. 15) may align with the inlet apertures 250 such that the inlet apertures are not blocked. Alternatively, the wrapper may be substantially air-permeable, particularly in the area adjacent the inlet apertures, so as to allow sufficient air passage therethrough and into the inlet aperture.

Air entering through the inlet apertures 250 in the first outer body 202 may be directed through the coupler 206 to the second outer body 204. In this regard, as illustrated in FIG. 20, the coupler 206 may define a recessed portion 254 at a peripheral surface 255 of the first engagement portion 208 thereof. The inlet apertures 250 may align with the recessed portion 254 of the coupler 206 when the first outer body 202 is engaged with the coupler.

Air received in the recessed portion 254 of the coupler 206 may be directed through one or more coupler inlets 256 defined in the coupler 206 at the recessed portion 254, as illustrated in FIG. 20. The coupler inlets 256 may connect to a longitudinal channel 258 extending along at least a portion of the longitudinal length of the coupler 206. Further, a pressure port 260 may be in fluid communication with the coupler inlet 256 and the longitudinal channel 258. The pressure port 260 may extend to an outer pressure port opening 262 positioned inside the first outer body 202 when the coupler 206 is connected thereto. As illustrated, the pressure port 260 may extend into the longitudinal channel 258. This configuration may be configured to resist leakage of fluid (e.g., condensation) from the longitudinal channel 258 into the first outer body 202 by defining an annular channel 314 configured to trap any such fluid.

The coupler 206 may include certain features configured to prevent blockage of the pressure port 260. As illustrated in FIG. 20, the coupler 206 may define one or more separator extensions 316 at an end of the coupler configured to engage the first outer body 202 (see, e.g., FIG. 16). The separator extensions 316 may be configured to prevent the power source 236 from blocking the pressure port opening 262. In this regard, the separator extensions 316 may define a shape that is configured to engage an end of the power source 236 such that the end of the power source is separated from the pressure port opening 262. For example, as illustrated in FIG. 21, in one embodiment the separator extensions 316 define arcs configured to engage the power source 236, which may define a substantially cylindrical configuration. Accordingly, the control module 240 may remain in fluid communication with the coupler inlet 256 through the pressure port 260. In this regard, contact between the power source 236 and the separator extensions does not block fluid communication between the control module 240 and the pressure port opening 260 as a result of gaps positioned between the separator extensions 316.

Thus, the control module 240 may detect a drop in pressure when a user draws on the aerosol delivery device 200. In some embodiments, as illustrated in FIG. 13, the end cap 218 may define one or more pressure normalization ports 318. The pressure normalization ports 318 may be configured to allow for pressure normalization within the first outer body 202 following a draw on the aerosol delivery device 200, to resist drawing moisture into the first outer body 202 as a result of a negative pressure being created therein. In this regard, moisture in the first outer body 202 could damage the power source 236 and the electrical circuit 238.

However, in another embodiment the end cap 218 may substantially seal the outer end 202B of the first outer body 202. Regardless, as illustrated in FIG. 20, a size of the pressure port opening 262 (e.g., a diameter thereof) or other portion of the pressure port 260 may be smaller than a diameter of a coupler outlet opening 264 or other portion of the longitudinal channel 258 in communication with the second outer body 204. Accordingly, a Venturi effect may be created during a draw on the aerosol delivery device 200, which may resist airflow through the first outer body 202 while still allowing for detection of a pressure drop therein.

Thus, as noted above, the control module 240 may sense a puff on the aerosol delivery device 200. When the puff is sensed, the control module 240 may direct current from the power source 236 through the electrical connectors 246 to the heating element 234. The heating element 234 may vaporize an aerosol precursor composition transported from the reservoir substrate 226 to the heating element via the liquid transport element 232. Accordingly, air and the entrained vapor (e.g., the components of the aerosol precursor composition in an inhalable form) may be directed to a user drawing on the aerosol delivery device.

In particular, air received through the inlet aperture 250 in the first outer body 202 may be directed through the recessed portion 254, the coupler inlet 256, and the longitudinal channel 258 extending along at least a portion of the longitudinal length of the coupler 206. Thereby, the air may be directed to the flow director 230. The flow director 230 may define a tubular configuration or other structure in which an air passageway is defined therethrough. In this regard, the coupler 206 may define a nipple 266.

The sealing member 298 may be received around the nipple 266 such that the inner ribs 302 (see, e.g., FIG. 18) seal thereagainst. Further, the nipple 266 of the coupler 206 may couple to the flow director 230. For example, the flow director 230 may extend over the nipple 266 of the coupler 206 to provide for engagement therebetween. In this regard, the flow director 230 may comprise a flexible, resilient material such as fiberglass which may deform (e.g., stretch) slightly to allow for receipt of the nipple 266 of the coupler 206 therein and fit snuggly over the nipple to form a seal therewith. Further, the flow director 230 may be coated with a fluid-resistant material such as a resin, silicone or silica oil, or other inert oil, which may thereby resist entry of the liquid aerosol precursor composition retained in the reservoir substrate 226 into the flow path defined through the flow director.

As illustrated in FIGS. 16 and 22, the flow director 230 may define a transverse aperture 270 configured to receive the atomizer 228 therethrough, and a slit 272 configured to facilitate insertion of the atomizer into the transverse aperture. In one embodiment the transverse slit may comprise a single segment. However, as illustrated in FIG. 22, in another embodiment the slit 272 may comprise a plurality of segments 272A, 272B (e.g., two segments), which are separated by a connector section 320. By retaining the connector section 320 between the segments 272A, 272B of the slit 272, issues with respect to the flow director 230 collapsing or otherwise becoming deformed proximate the slit 272 during assembly or usage of the aerosol delivery device 200 may be avoided. In this regard, deformation of the flow director 230 may impede flow therethough and/or allow for movement of the atomizer 228 out of position from within the transverse aperture 270. However, the slit 272 may still allow for simplified assembly of the aerosol delivery device 200 by providing a larger aperture through which the atomizer 238 may be inserted.

Although the connector section 320 of the flow director 230 may contribute to retention of the flow director 230 in a desired (e.g., tubular) configuration following the insertion of the atomizer 238 therein, in some embodiments the aerosol delivery device may additionally or alternatively include additional features configured to assist in retaining such a configuration. In this regard, as illustrated in FIG. 16, the aerosol delivery device 200 may further comprise a flow director fastener 322 extending at least partially around the flow director 230, the flow director fastener being configured to retain a shape of the flow director 230, prevent leakage of the aerosol precursor composition through the slit 272, and/or prevent movement of the atomizer 228.

As illustrated, the flow director fastener 322 may define a tubular configuration and may extend around the flow director 230 proximate the slit 272. For example, a position of the flow director fastener 322 along the longitudinal length of the flow director 230 may overlap with the slit 272. Accordingly, the flow director fastener 322 may support the flow director 230 such that the flow director does not collapse or otherwise deform proximate the slit 272. Further, supporting the flow director 230 proximate the slit 272 may resist movement of the atomizer 228. In this regard, in some embodiments the atomizer 228 may define a substantially straight configuration, without inclusion of angularly extending arms at ends thereof, which may cause the atomizer to otherwise be prone to movement (e.g., into the slit 272) without inclusion of the flow director fastener 322. Further, in some embodiments the flow director fastener 322 may resist leakage of the aerosol precursor composition through the slit 272 into a longitudinal aperture 268 extending through the flow director 230. In this regard, the flow director fastener 322 may comprise fiberglass and may be coated with a fluid-resistant material such as a resin, silicone oil, or other inert oil. Further, the flow director fastener 322 may cover the slit 272 to resist suction in the longitudinal aperture 268, as caused by a user draw on the aerosol delivery device 200, from drawing the aerosol precursor composition directly therethrough from the reservoir substrate 226.

As noted above, in some embodiments the atomizer 238 may extend substantially linearly between first and second ends 238A, 238B. Thus, the liquid transport element 232 may not include arms extending substantially perpendicularly to the transverse aperture 270. In this regard, contact between the liquid transport element 232 and the reservoir substrate 226 on opposing sides of the transverse aperture 270 may be sufficient to draw the aerosol precursor composition from the reservoir substrate to the liquid transport element. Thus, a relatively shorter segment of material may be employed to form the liquid transport element 232, which may reduce the cost of the aerosol delivery device 200 and/or facilitate assembly thereof by not requiring bending of the liquid transport element.

Accordingly, air received from the coupler 206 may be directed through a longitudinal aperture 268 defined through the flow director 230. Thus, air drawn through the aerosol delivery device 200 is directed past the heating element 234 before being directed to a mouthpiece assembly 324. The mouthpiece assembly 324 may include the mouthpiece 220 and a mouthpiece connector 326. An enlarged perspective view of the mouthpiece connector 326 is illustrated in FIG. 23. As illustrated, the mouthpiece connector 326 may include a nipple 328, a stop 330, and a mouthpiece receiver 332.

As illustrated in FIG. 16, the mouthpiece 220 may engage the mouthpiece receiver 332 and abut the stop 330 of the mouthpiece connector 326. Further, the flow director 230 may engage the nipple 328 of the mouthpiece connector 326. As noted above, the flow director 230 may comprise a flexible, resilient material such as fiberglass. Thus, the flow director 230 may deform (e.g., stretch) slightly to allow for receipt of the nipple 328 of the mouthpiece connector 326 therein.

The aerosol delivery device 200 may additionally include a substrate fastener 334. As illustrated in FIG. 24, the substrate fastener 334 may define an annular configuration. Further, the substrate fastener 334 may define an inner engagement surface 336 and a side engagement surface 338.

The substrate fastener 334 may extend at least partially around the flow director 230 and the nipple 328 of the mouthpiece assembly 324. The substrate fastener 334 may be configured to retain the reservoir substrate 226 in a selected position. For example, the substrate fastener 334 may comprise silicone or other resilient material that stretches around the nipple 328 of the mouthpiece connector 326 and the flow director 230 such that the inner engagement surface 336 pinches the flow director against the nipple, thereby further assisting in retaining the flow director in place. Further, the side engagement surface 338 may be positioned in contact with a longitudinal end of the reservoir substrate 226. Thereby, the coupler 206 and the substrate fastener 334 may engage opposing ends of the reservoir substrate 226 such that the reservoir substrate is securely retained in place within the second outer body 204.

Accordingly, as described above, air entering through the first outer body 202 may be directed through the coupler 206 to the flow director 230. In the flow director 230, the aerosol precursor composition transported from the reservoir substrate 226 to the heating element 234 via the liquid transport element 232 may be vaporized and introduced into the airstream. Thereby, aerosol may be transported through the flow director 230 and the mouthpiece assembly 324 to a user's mouth.

Still further components can be utilized in the aerosol delivery devices 100, 200 of the present disclosure. For example, U.S. Pat. No. 5,154,192 to Sprinkel et al, and U.S. Pat. No. 8,539,959 to Scatterday disclose indicators and LEDs for smoking articles; U.S. Pat. No. 5,261,424 to Sprinkel, Jr. discloses piezoelectric sensors that can be associated with the mouthend of a device to detect user lip activity associated with taking a draw and then trigger heating; U.S. Pat. No. 5,372,148 to McCafferty et al. discloses a puff sensor for controlling energy flow into a heating load array in response to pressure drop through a mouthpiece; U.S. Pat. No. 5,967,148 to Harris et al. discloses receptacles in a smoking device that include an identifier that detects a non-uniformity in infrared transmissivity of an inserted component and a controller that executes a detection routine as the component is inserted into the receptacle; U.S. Pat. No. 6,040,560 to Fleischhauer et al. describes a defined executable power cycle with multiple differential phases; U.S. Pat. No. 5,934,289 to Watkins et al. discloses photonic-optronic components; U.S. Pat. No. 5,954,979 to Counts et al. discloses means for altering draw resistance through a smoking device; U.S. Pat. No. 6,803,545 to Blake et al. discloses specific battery configurations for use in smoking devices; U.S. Pat. No.

7,293,565 to Griffen et al. discloses various charging systems for use with smoking devices; U.S. Pat. No. 8,402,976 to Fernando et al. discloses computer interfacing means for smoking devices to facilitate charging and allow computer control of the device; U.S. Pat. No. 8,689,804 to Fernando et al. discloses identification systems for smoking devices; and WO 2010/003480 by Flick discloses a fluid flow sensing system indicative of a puff in an aerosol generating system; all of the foregoing disclosures being incorporated herein by reference in their entireties. Further examples of components related to electronic aerosol delivery articles and disclosing materials or components that may be used in the present articles include U.S. Pat. No. 4,735,217 to Gerth et al.; U.S. Pat. No. 5,249,586 to Morgan et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; U.S. Pat. Nos. 8,156,944; 8,375,957 to Hon; U.S. Pat. No. 8,794,231 to Thorens et al.; U.S. Pat. No. 8,851,083 to Oglesby et al.; U.S. Pat. App. Pub. Nos. 2006/0196518 and 2009/0188490 to Hon; U.S. Pat. App. Pub. Nos. 2009/0260641 and 2009/0260642 to Monsees et al.; U.S. Pat. App. Pub. No. 2010/0024834 to Oglesby et al.; U.S. Pat. App. Pub. No. 2010/0307518 to Wang; WO 2010/091593 to Hon; WO 2013/089551 to Foo; and U.S. patent application Ser. No. 13/841,233 to DePiano et al., filed Mar. 15, 2013, each of which is incorporated herein by reference in its entirety. A variety of the materials disclosed by the foregoing documents may be incorporated into the present devices in various embodiments, and all of the foregoing disclosures are incorporated herein by reference in their entireties.

Various other details with respect to the components that may be included in the aerosol delivery devices, are provided, for example, in U.S. patent application Ser. No. 13/840,264 to Novak et al., filed Mar. 15, 2013, U.S. Pat. No. 8,365,742 to Hon; U.S. Pat. Pub. Nos. 2013/0192623 to Tucker et al., 2013/0298905 to Leven et al., and 2013/0180553 to Kim et al., each of which is incorporated herein by reference in its entirety. Reference is also made, for example, to the reservoir and heater system for controllable delivery of multiple aerosolizable materials in an electronic smoking article disclosed in U.S. Pat. App. Pub. No. 2014/0000638 to Sebastian et al., which is incorporated herein by reference in its entirety.

Additionally, various components of the aerosol delivery devices according to the present disclosure can be chosen from components described in the art and that have been commercially available. In this regard, representative products that resemble many of the attributes of traditional types of cigarettes, cigars or pipes have been marketed as ACCORD® by Philip Morris Incorporated; ALPHA™, JOYE 510™ and M4™ by InnoVapor LLC; CIRRUS™ and FLING™ by White Cloud Cigarettes; BLU™ by Lorillard Technologies, Inc.; COHITA™, COLIBRI™, ELITE CLASSIC™, MAGNUM™, PHANTOM™ and SENSE™ by Epuffer® International Inc.; DUOPRO™, STORM™ and VAPORKING® by Electronic Cigarettes, Inc.; EGAR™ by Egar Australia; eGo-C™ and eGo-T™ by Joyetech; ELUSION™ by Elusion UK Ltd; EONSMOKE® by Eonsmoke LLC; FIN™ by FIN Branding Group, LLC; SMOKE® by Green Smoke Inc. USA; GREENARETTE™ by Greenarette LLC; HALLIGAN™, HENDU™, JET™, MAXXQ™, PINK™ and PITBULL™ by Smoke Stik®; HEATBAR™ by Philip Morris International, Inc.; HYDRO IMPERIAL™ and LXE™ from Crown7; LOGIC™ and THE CUBAN™ by LOGIC Technology; LUCI® by Luciano Smokes Inc.; METRO® by Nicotek, LLC; NJOY® and ONEJOY™ by Sottera, Inc.; NO. 7™ by SS Choice LLC; PREMIUM ELECTRONIC CIGARETTE™ by PremiumEstore LLC; RAPP E-MYSTICK™ by Ruyan America, Inc.; RED DRAGON™ by Red Dragon Products, LLC; RUYAN® by Ruyan Group (Holdings) Ltd.; SF® by Smoker Friendly International, LLC; GREEN SMART SMOKER® by The Smart Smoking Electronic Cigarette Company Ltd.; SMOKE ASSIST® by Coastline Products LLC; SMOKING EVERYWHERE® by Smoking Everywhere, Inc.; V2CIGS™ by VMR Products LLC; VAPOR NINE™ by VaporNine LLC; VAPOR4LIFE® by Vapor 4 Life, Inc.; VEPPO™ by E-CigaretteDirect, LLC; VUSE® by R. J. Reynolds Vapor Company; Mistic Menthol product by Mistic Ecigs; and the Vype product by CN Creative Ltd. Yet other electrically powered aerosol delivery devices, and in particular those devices that have been characterized as so-called electronic cigarettes, have been marketed under the tradenames COOLER VISIONS™; DIRECT E-CIG™; DRAGONFLY™; EMIST™; EVERSMOKE™; GAMUCCI®; HYBRID FLAME™; KNIGHT STICKS™; ROYAL BLUES™; SMOKETIP®; SOUTH BEACH SMOKE™.

Additional manufacturers, designers, and/or assignees of components and related technologies that may be employed in the aerosol delivery devices of the present disclosure include Shenzhen Jieshibo Technology of Shenzhen, China; Shenzhen First Union Technology of Shenzhen City, China; Safe Cig of Los Angeles, Calif.; Janty Asia Company of the Philippines; Joyetech Changzhou Electronics of Shenzhen, China; SIS Resources; B2B International Holdings of Dover, Del.; Evolv LLC of OH; Montrade of Bologna, Italy; Shenzhen Bauway Technology of Shenzhen, China; Global Vapor Trademarks Inc. of Pompano Beach, Fla.; Vapor Corp. of Fort Lauderdale, Fla.; Nemtra GMBH of Raschau-Markersbach, Germany, Perrigo L. Co. of Allegan, Mich.; Needs Co., Ltd.; Smokefree Innotec of Las Vegas, Nev.; McNeil A B of Helsingborg, Sweden; Chong Corp; Alexza Pharmaceuticals of Mountain View, Calif.; BLEC, LLC of Charlotte, N.C.; Gaitrend Sarl of Rohrbach-les-Bitche, France; FeelLife Bioscience International of Shenzhen, China; Vishay Electronic BMGH of Selb, Germany; Shenzhen Smaco Technology Ltd. of Shenzhen, China; Vapor Systems International of Boca Raton, Fla.; Exonoid Medical Devices of Israel; Shenzhen Nowotech Electronic of Shenzhen, China; Minilogic Device Corporation of Hong Kong, China; Shenzhen Kontle Electronics of Shenzhen, China, and Fuma International, LLC of Medina, Ohio, and 21st Century Smoke of Beloit, Wis.

In another embodiment, part or substantially all of the aerosol delivery devices may be formed from one or more carbon materials, which may provide advantages in terms of biodegradability and absence of wires. In this regard, the heating element may comprise carbon foam, the reservoir may comprise carbonized fabric, and graphite may be employed to form an electrical connection with the battery and controller. An example embodiment of a carbon-based cartridge is provided in U.S. Pat. App. Pub. No. 2013/0255702 to Griffith et al., which is incorporated herein by reference in its entirety.

Note that in the embodiment of the aerosol delivery devices described above, first and second outer bodies are employed. Use of two or more outer bodies may be advantageous in a number of respects. For example, usage of first and second outer bodies connected by a coupler may facilitate assembly in that it may be relatively easier to insert components into two, relatively short outer bodies defining a total of four component entry points at the ends thereof, than to insert components into a single elongated body defining a total of only two component entry points at the ends thereof.

Additionally, the components may be assembled in each of the outer bodies separately. Thus, for example, components may be assembled in the first outer body at a separate time and/or location as compared to assembly of the components in the second outer body. By way of further example, the outer bodies may be assembled with their respective components under different conditions in some embodiments. In this regard, it may be desirable to assemble components in the second outer body under controlled conditions to avoid contamination of the airflow path extending therethrough or undesirable absorption of moisture in the reservoir substrate, which may cause leaks or affect the resulting aerosol.

Separate assembly of the components in the first and second outer bodies may also allow for separate quality control tests to be performed on the first and second portions of the aerosol delivery device defined by the first and second outer bodies, which may be conducted at differing times and/or differing locations. In this regard, one section of the aerosol delivery device may be subjected to greater scrutiny and/or testing within a more-carefully controlled environment. For example, in the embodiments described above, the second outer body includes the reservoir substrate and defines an airflow path therethough, and hence this section may be subjected to additional testing to ensure that the airflow path is clear and that there are no leaks.

Further, separate assembly of the components in the outer bodies may additionally allow for final assembly of the aerosol delivery device at an alternate location and/or time, if desirable. For example, a consumer may be provided with the outer bodies respectively having the components assembled therein, and final assembly may be completed by the consumer. Further, enhanced customization of the aerosol delivery device and/or supply chain management may be provided by use of separate outer bodies. In this regard, for example, multiple embodiments of components may be received in one or both of the outer bodies. Thus for example, the first outer body may be provided with either regular or extended capacity power sources, which may be employed irrespective of the components received in the second outer body. Conversely, the second outer body may include reservoir substrates having any of varying capacities and/or types of aerosol precursor compositions received therein. Thus, various embodiments of aerosol delivery devices may be formed simply by selecting the appropriate desired embodiment of outer bodies, which may be respectively assembled in advance, rather than specifically assembled to suit demand.

As may be understood, the coupler may additionally provide and/or facilitate the above-noted benefits by allowing for coupling of the outer bodies. Further, the coupler may be coupled to one of the outer bodies in advance of completion of the aerosol delivery device in order to complete a section of the aerosol delivery device. For example, the coupler may be coupled to the second outer body to seal the reservoir substrate and other components therein and prevent leakage of the aerosol precursor composition therefrom.

In addition to resisting leakage of the aerosol precursor composition from the second outer body, the coupler may additionally resist leakage from the power source into the second outer body and the airflow path extending therethrough. In this regard, certain embodiments of power sources may comprise batteries including liquids therein which provide for power storage. In the event of failure of the power source, such fluids may leak therefrom. However, as a result of the coupler being positioned between the first outer body and the second outer body, such fluid may not enter the second outer body. In this regard, the first outer body and the coupler may define a first compartment, and the second outer body and the coupler may define a second compartment. The first compartment and the second compartment may be generally sealed from one another and out of fluid communication with one another as a result of the coupler extending therebetween, thereby preventing cross-contamination between the two compartments which may otherwise occur in embodiments of aerosol delivery devices including a single outer body.

Accordingly, the embodiments of aerosol delivery devices including multiple outer bodies as provided herein may provide benefits over existing embodiments of aerosol delivery devices that include a single, unitary housing, such as those embodiments of aerosol delivery devices disclosed in U.S. Pat. Nos. 8,364,742 and 8,393,331 to Hon, which are incorporated herein by reference in their entireties. Additional examples of aerosol delivery devices including a single, unitary housing are commercially available Vype™ by CN Creative, LTD and NJOY® by Sottera, Inc.

A method for assembling an aerosol delivery device is also provided. As illustrated in FIG. 25, the method may include positioning a power source in a first outer body defining an inlet aperture at operation 402. Further, the method may include positioning an atomizer in a second outer body at operation 404. The method may additionally include engaging a coupler defining a coupler inlet and a longitudinal channel with the first outer body and the second outer body such that the coupler is positioned to receive air from the inlet aperture defined in the first outer body through the coupler inlet and to direct the air through the longitudinal channel to the second outer body at operation 406.

In some embodiments the method may further comprise substantially irreversibly securing the first outer body to the second outer body with a securing mechanism. Substantially irreversibly securing the first outer body to the second outer body with the securing mechanism may comprise wrapping a wrapper at least partially around the first outer body, the second outer body, and the coupler. The method may additionally include positioning a reservoir substrate and a flow director in the second outer body such that the flow director extends at least partially through the reservoir substrate. Positioning the atomizer in the second outer body may comprise inserting the atomizer through a transverse aperture extending through the flow director.

The method may further comprise inserting a plurality of electrical connectors through the coupler and connecting the electrical connectors to the power source and the atomizer. The method may additionally include coupling a heating element to a center portion of a liquid transport element to form the atomizer and folding first and second opposing arms of the liquid transport element extending from the center section away from the coupler.

In some embodiments the method may further comprise coupling the flow director to a nipple of the coupler. The method may also include coupling the flow director to a nipple of a mouthpiece. Further, engaging the coupler with the first outer body and the second outer body at operation 406 may comprise engaging a rib of the coupler with the first outer body and the second outer body.

In another embodiment a method for assembling an aerosol delivery device is provided, as illustrated in FIG. 26. The method may include positioning a power source in a first outer body at operation 502. Further, the method may include positioning an atomizer in a second outer body at operation 504. The method may additionally include engaging a coupler defining a coupler inlet with the first outer body and the second outer body such that the coupler is positioned between the first outer body and the second outer body and configured to receive air through the coupler inlet and to direct the air to the second outer body at operation 506. The method may also include welding the coupler to the first outer body and the second outer body at operation 508.

In some embodiments the method may further comprise positioning a reservoir substrate and a flow director in the second outer body such that the flow director extends at least partially through the reservoir substrate. Additionally, the method may include coupling the flow director to a nipple of the coupler. Further, the method may include engaging a flow director fastener with the flow director such that the flow director fastener extends at least partially thereabout.

The method may also include coupling the flow director to a nipple of a mouthpiece assembly. Further, the method may include engaging a substrate fastener with the flow director such that the substrate fastener extends at least partially around the nipple of the mouthpiece assembly. Engaging the coupler with the first outer body and the second outer body at operation 506 may comprise engaging a rib of the coupler with the first outer body and the second outer body. Engaging the coupler with the first outer body and the second outer body at operation 506 may further comprise engaging the first outer body with a first engagement portion of the coupler and engaging the second outer body with a second engagement portion of the coupler, the first engagement portion and the second engagement portion being separated by the rib. Welding the coupler to the first outer body and the second outer body at operation 508 may comprise laser welding the coupler to the first outer body and the second outer body. The method may additionally include engaging a sealing member with the coupler and piercing the sealing member with one or more electrical connectors such that the one or more electrical connectors extend through and seal against the sealing member.

In an additional embodiment a controller configured to assemble aerosol delivery devices of the present disclosure is provided. The controller may be configured to execute computer code for performing the operations described herein. In this regard, as illustrated in FIG. 27, the controller 600 may comprise a processor 602 that may be a microprocessor or a controller for controlling the overall operation thereof. In one embodiment the processor 602 may be particularly configured to execute the functions described herein, including the operations for assembling the aerosol delivery devices 100, 200 of the present disclosure. The controller 600 may also include a memory device 604. The memory device 604 may include non-transitory and tangible memory that may be, for example, volatile and/or non-volatile memory. The memory device 604 may be configured to store information, data, files, applications, instructions or the like. For example, the memory device 604 could be configured to buffer input data for processing by the processor 602. Additionally or alternatively, the memory device 604 may be configured to store instructions for execution by the processor 602.

The controller 600 may also include a user interface 606 that allows a user to interact therewith. For example, the user interface 606 can take a variety of forms, such as a button, keypad, dial, touch screen, audio input interface, visual/image capture input interface, input in the form of sensor data, etc. Still further, the user interface 606 may be configured to output information to the user through a display, speaker, or other output device. A communication interface 608 may provide for transmitting and receiving data through, for example, a wired or wireless network 610 such as a local area network (LAN), a metropolitan area network (MAN), and/or a wide area network (WAN), for example, the Internet.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling the above-described operations. In particular, computer readable code may be configured to perform each of the operations of the methods described herein and embodied as computer readable code on a computer readable medium for controlling the above-described operations. In this regard, a computer readable storage medium, as used herein, refers to a non-transitory, physical storage medium (e.g., a volatile or non-volatile memory device, which can be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

As noted above, the controller 600 may be configured to execute computer code for performing the above-described assembly operations. In this regard, the controller 600 may comprise an assembly module 612. The assembly module 612 may be configured to perform the various assembly operations described herein including, for example, coupling a first outer body and a second outer body to a coupler. Additional or alternative assembly operations performed by the assembly module 612 may include welding of the first outer body and the second outer body to the coupler.

Further, an embodiment of a non-transitory computer readable medium for storing computer instructions executed by a processor in a controller (e.g. the controller 600) configured to assemble an aerosol delivery device is provided. The non-transitory computer readable medium may comprise program code instructions for positioning a power source in a first outer body defining an inlet aperture, program code instructions for positioning an atomizer in a second outer body, and program code instructions for engaging a coupler defining a coupler inlet and a longitudinal channel with the first outer body and the second outer body such that the coupler is positioned to receive air from the inlet aperture defined in the first outer body through the coupler inlet and to direct the air through the longitudinal channel to the second outer body.

In some embodiments the computer readable medium may further comprise program code instructions for substantially irreversibly securing the first outer body to the second outer body with a securing mechanism. The program code instructions for substantially irreversibly securing the first outer body to the second outer body with the securing mechanism may comprise program code instructions for wrapping a wrapper at least partially around the first outer body, the second outer body, and the coupler. The computer readable medium may further comprise program code instructions for positioning a reservoir substrate and a flow director in the second outer body such that the flow director extends at least partially through the reservoir substrate. The program code instructions for positioning the atomizer in the second outer body may comprise program code instructions for inserting the atomizer through a transverse aperture extending through the flow director.

The computer readable medium may further comprise program code instructions for inserting a plurality of electrical connectors through the coupler program code instructions for connecting the electrical connectors to the power source and the atomizer. The computer readable medium may further comprise program code instructions for coupling a heating element to a center portion of a liquid transport element to form the atomizer and program code instructions for folding first and second opposing arms of the liquid transport element extending from the center section away from the coupler. The computer readable medium may further comprise program code instructions for coupling the flow director to a nipple of the coupler. The computer readable medium may further comprise program code instructions for coupling the flow director to a nipple of a mouthpiece. The program code instructions for engaging the coupler with the first outer body and the second outer body may comprise program code instructions for engaging a rib of the coupler with the first outer body and the second outer body.

An additional embodiment of a non-transitory computer readable medium for storing computer instructions executed by a processor in a controller (e.g. the controller 500) configured to assemble an aerosol delivery device is provided. The non-transitory computer readable medium may comprise program code instructions for positioning a power source in a first outer body, program code instructions for positioning an atomizer in a second outer body, program code instructions for engaging a coupler defining a coupler inlet with the first outer body and the second outer body such that the coupler is positioned between the first outer body and the second outer body and configured to receive air through the coupler inlet and to direct the air to the second outer body, and program code instructions for welding the coupler to the first outer body and the second outer body.

In some embodiments the computer readable medium may further comprise program code instructions for positioning a reservoir substrate and a flow director in the second outer body such that the flow director extends at least partially through the reservoir substrate. Additionally, the computer readable medium may comprise program code instructions for coupling the flow director to a nipple of the coupler. Further, the computer readable medium may comprise program code instructions for engaging a flow director fastener with the flow director such that the flow director fastener extends at least partially thereabout.

In some embodiments the computer readable medium may additionally include program code instructions for coupling the flow director to a nipple of a mouthpiece assembly. Further, the computer readable medium may comprise program code instructions for engaging a substrate fastener with the flow director such that the substrate fastener extends at least partially around the nipple of the mouthpiece assembly. The program code instructions for engaging the coupler with the first outer body and the second outer body may comprise program code instructions for engaging a rib of the coupler with the first outer body and the second outer body. The program code instructions for engaging the coupler with the first outer body and the second outer body may further comprise program code instructions for engaging the first outer body with a first engagement portion of the coupler and program code instructions for engaging the second outer body with a second engagement portion of the coupler, the first engagement portion and the second engagement portion being separated by the rib. The program code instructions for welding the coupler to the first outer body and the second outer body may comprise program code instructions for laser welding the coupler to the first outer body and the second outer body. Additionally, the computer readable medium may comprise program code instructions for engaging a sealing member with the coupler and piercing the sealing member with one or more electrical connectors such that the one or more electrical connectors extend through and seal against the sealing member.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. An aerosol delivery device, comprising:
a first outer body;
a second outer body;
a power source positioned in the first outer body;
an atomizer positioned in the second outer body;
one or more electrical connectors configured to electrically connect the atomizer to the power source;
a coupler defining a first engagement portion, a second engagement portion, an outer rib positioned between the first engagement portion and the second engagement portion, an annular recess positioned at an end of the second engagement portion, at least one connector aperture configured to receive the one or more electrical connectors, a coupler inlet disposed on the first engagement portion, and a longitudinal channel in fluid communication with the coupler inlet; and
a sealing member defining an annular shape, the sealing member comprising one or more penetrable portions, at least two inner ribs disposed about an interior of the annular shape and at least one outer rib disposed about an exterior of the annular shape;
wherein the sealing member is arranged within the annular recess of the coupler such that the at least two inner ribs seal against the inner surface of the annular recess and the at least one outer rib seals against the outer surface of the annular recess;
wherein the one or more electrical connectors are configured to pass through the at least one connector aperture of the coupler and to pierce and extend through the one or more penetrable portions of the sealing member;
wherein the sealing member is configured to seal against the coupler and the one or more electrical connectors;
wherein the first engagement portion is welded to the first outer body and the second engagement portion is welded to the second outer body; and
wherein the coupler is configured to receive air through the coupler inlet and to direct the air to the atomizer in the second outer body through the longitudinal channel.

2. The aerosol delivery device of claim 1, further comprising a reservoir and a flow director positioned in the second outer body, the flow director extending at least partially through the reservoir.

3. The aerosol delivery device of claim 2, wherein the coupler defines a nipple and the flow director engages the nipple of the coupler.

4. The aerosol delivery device of claim 2, further comprising a flow director fastener extending at least partially around the flow director and a slit defined through the flow director.

5. The aerosol delivery device of claim 2, further comprising a mouthpiece assembly defining a nipple, wherein the flow director engages the nipple of the mouthpiece assembly.

6. The aerosol delivery device of claim 5, further comprising a substrate fastener extending at least partially around the flow director and the nipple of the mouthpiece assembly, the substrate fastener being configured to retain the reservoir in a selected position.

7. The aerosol delivery device of claim 1, wherein the atomizer extends linearly between first and second ends of the atomizer.

8. The aerosol delivery device of claim 1, wherein the coupler is laser welded to the first outer body and the second outer body.

9. The aerosol delivery device of claim 1, wherein the outer rib of the coupler is configured to separate the first outer body from the second outer body.

10. The aerosol delivery device of claim 1, wherein the coupler further defines a recessed portion at a peripheral surface of the first engagement portion, and wherein the coupler inlet is defined through the recessed portion.

11. The aerosol delivery device of claim 1, wherein the coupler defines one or more separator extensions and a pressure port proximate the first outer body and in fluid communication with the coupler inlet, the one or more separator extensions being configured to prevent the power source from blocking the pressure port.

12. The aerosol delivery device of claim 11, wherein the pressure port extends into the longitudinal channel to resist leakage into the first outer body.

13. A method for assembling an aerosol delivery device, the method comprising:

positioning a power source in a first outer body;

positioning an atomizer in a second outer body;

providing one or more electrical connectors configured to electrically connect the atomizer to the power source;

providing a coupler defining a first engagement portion, a second engagement portion, an outer rib positioned between the first engagement portion and the second engagement portion, an annular recess positioned at an end of the second engagement portion, at least one connector aperture configured to receive the one or more electrical connectors, a coupler inlet disposed on the first engagement portion, and a longitudinal channel in fluid communication with the coupler inlet;

providing a sealing member defining an annular shape, one or more penetrable portions, at least two inner ribs disposed about an interior of the annular shape and at least one outer rib disposed about an exterior of the annular shape;

positioning the sealing member within the annular recess of the coupler such that the at least two inner ribs seal against the inner surface of the annular recess and the at least one outer rib seals against the outer surface of the annular recess;

engaging the first engagement portion of the coupler with the first outer body and the second engagement portion of the coupler with the second outer body such that the coupler is positioned between the first outer body and the second outer body and configured to receive air through the coupler inlet and to direct the air to the atomizer in the second outer body through the longitudinal channel;

positioning the one or more electrical connectors such that the one or more electrical connectors pass through the at least one connector aperture of the coupler, pierce and extend through the one or more penetrable portions of the sealing member and connect the atomizer to the power source;

sealing against the coupler and the one or more electrical connectors with the sealing member; and welding the first engagement portion of the coupler to the first outer body and the second engagement portion of the coupler to the second outer body.

14. The method of claim 13, further comprising positioning a reservoir and a flow director in the second outer body such that the flow director extends at least partially through the reservoir.

15. The method of claim 14, further comprising coupling the flow director to a nipple of the coupler.

16. The method of claim 14, further comprising engaging a flow director fastener with the flow director such that the flow director fastener extends at least partially thereabout.

17. The method of claim 14, further comprising coupling the flow director to a nipple of a mouthpiece assembly.

18. The method of claim 17, further comprising engaging a substrate fastener with the flow director such that the substrate fastener extends at least partially around the nipple of the mouthpiece assembly.

19. The method of claim 13, wherein welding the first engagement portion of the coupler to the first outer body and the second engagement portion of the coupler to the second outer body comprises laser welding the first engagement portion of the coupler to the first outer body and the second engagement portion of the coupler to the second outer body.

* * * * *